United States Patent
Grove

(10) Patent No.: US 9,514,128 B2
(45) Date of Patent: *Dec. 6, 2016

(54) SYSTEM AND METHOD TO FACILITATE TRANSLATION OF COMMUNICATIONS BETWEEN ENTITIES OVER A NETWORK

(71) Applicant: eBay Inc., San Jose, CA (US)

(72) Inventor: Steve Grove, San Jose, CA (US)

(73) Assignee: eBay Inc., San Jose, CA (US)

( * ) Notice: Subject to any disclaimer, the term of this patent is extended or adjusted under 35 U.S.C. 154(b) by 281 days.

This patent is subject to a terminal disclaimer.

(21) Appl. No.: 14/165,434

(22) Filed: Jan. 27, 2014

(65) Prior Publication Data

US 2014/0142919 A1 May 22, 2014

Related U.S. Application Data

(63) Continuation of application No. 12/783,458, filed on May 19, 2010, now Pat. No. 8,639,829, which is a
(Continued)

(51) Int. Cl.
*G06F 17/28* (2006.01)
*G06F 17/27* (2006.01)
(Continued)

(52) U.S. Cl.
CPC ........... *G06F 17/289* (2013.01); *G06F 17/275* (2013.01); *G06F 17/28* (2013.01); *G06Q 30/08* (2013.01);
(Continued)

(58) Field of Classification Search
CPC ...... G06F 17/275; G06F 17/28; G06F 17/289; G06Q 30/08; H04L 67/28; H04L 67/306; H04L 67/329
(Continued)

(56) References Cited

U.S. PATENT DOCUMENTS 3,573,747 A 4/1971 Adams et al.
3,581,072 A 5/1971 Nymeyer
(Continued)

FOREIGN PATENT DOCUMENTS

CA 2253543 A1 3/1997
CN 1139782 A 1/1997
(Continued)

OTHER PUBLICATIONS

"U.S. Appl. No. 10/252,129, Examiner Interview Summary mailed May 15, 2015", 3 pgs.
(Continued)

*Primary Examiner* — Jerry Dennison
(74) *Attorney, Agent, or Firm* — Schwegman, Lundberg & Woessner, P.A.

(57) ABSTRACT

A system and method to facilitate translation of communications between entities over a network are described. Multiple predetermined language constructs are communicated to a first entity as a first transmission over the network. Responsive to selection by the first entity of a language construct from the predetermined language constructs, a translated language construct corresponding to the selected language construct is identified. Finally, the translated language construct is communicated to a second entity as a second transmission over the network.

18 Claims, 7 Drawing Sheets

Related U.S. Application Data continuation of application No. 09/976,301, filed on Oct. 11, 2001, now Pat. No. 7,752,266.

(51) Int. Cl.
*G06Q 30/08* (2012.01)
*H04L 29/08* (2006.01)

(52) U.S. Cl.
CPC .............. *H04L 67/28* (2013.01); *H04L 67/306* (2013.01); *H04L 69/329* (2013.01); *H04L 67/2823* (2013.01)

(58) Field of Classification Search
USPC .......................................... 703/230; 704/277
See application file for complete search history.

(56) References Cited

U.S. PATENT DOCUMENTS

| | | | |
|---|---|---|---|
| 4,412,287 A | 10/1983 | Braddock, III | |
| 4,674,044 A | 6/1987 | Kalmus et al. | |
| 4,677,552 A | 6/1987 | Sibley, Jr. | |
| 4,789,928 A | 12/1988 | Fujisaki | |
| 4,799,156 A | 1/1989 | Shavit et al. | |
| 4,823,265 A | 4/1989 | Nelson | |
| 4,864,516 A | 9/1989 | Gaither et al. | |
| 4,903,201 A | 2/1990 | Wagner | |
| 5,063,507 A | 11/1991 | Lindsey et al. | |
| 5,063,523 A | 11/1991 | Vrenjak | |
| 5,077,665 A | 12/1991 | Silverman et al. | |
| 5,101,353 A | 3/1992 | Lupien et al. | |
| 5,136,501 A | 8/1992 | Silverman et al. | |
| 5,168,446 A | 12/1992 | Wiseman | |
| 5,205,200 A | 4/1993 | Wright | |
| 5,243,515 A | 9/1993 | Lee | |
| 5,258,908 A | 11/1993 | Hartheimer et al. | |
| 5,280,422 A | 1/1994 | Moe et al. | |
| 5,297,031 A | 3/1994 | Gutterman et al. | |
| 5,297,032 A | 3/1994 | Trojan et al. | |
| 5,305,200 A | 4/1994 | Hartheimer et al. | |
| 5,325,297 A | 6/1994 | Bird et al. | |
| 5,329,589 A | 7/1994 | Fraser et al. | |
| 5,349,368 A | 9/1994 | Takeda et al. | |
| 5,375,055 A | 12/1994 | Togher et al. | |
| 5,384,701 A | 1/1995 | Stentiford et al. | |
| 5,392,428 A | 2/1995 | Robins | |
| 5,394,324 A | 2/1995 | Clearwater | |
| 5,418,949 A | 5/1995 | Suzuki | |
| 5,426,281 A | 6/1995 | Abecassis | |
| 5,434,978 A | 7/1995 | Dockter et al. | |
| 5,442,546 A | 8/1995 | Kaji et al. | |
| 5,442,782 A | 8/1995 | Malatesta et al. | |
| 5,485,510 A | 1/1996 | Colbert | |
| 5,497,319 A | 3/1996 | Chong et al. | |
| 5,535,403 A | 7/1996 | Li et al. | |
| 5,544,051 A | 8/1996 | Senn et al. | |
| 5,553,145 A | 9/1996 | Micali | |
| 5,557,728 A | 9/1996 | Garrett et al. | |
| 5,592,668 A | 1/1997 | Harding et al. | |
| 5,596,994 A | 1/1997 | Bro | |
| 5,598,557 A | 1/1997 | Doner et al. | |
| 5,600,833 A | 2/1997 | Senn et al. | |
| 5,640,569 A | 6/1997 | Miller et al. | |
| 5,652,896 A | 7/1997 | Yamauchi et al. | |
| 5,657,389 A | 8/1997 | Houvener | |
| 5,664,115 A | 9/1997 | Fraser | |
| 5,689,652 A | 11/1997 | Lupien et al. | |
| 5,694,546 A | 12/1997 | Reisman | |
| 5,696,909 A | 12/1997 | Wallner | |
| 5,706,457 A | 1/1998 | Dwyer et al. | |
| 5,710,889 A | 1/1998 | Clark et al. | |
| 5,715,314 A | 2/1998 | Payne et al. | |
| 5,715,402 A | 2/1998 | Popolo | |
| 5,717,989 A | 2/1998 | Tozzoli et al. | |
| 5,722,418 A | 3/1998 | Bro | |
| 5,724,524 A | 3/1998 | Hunt et al. | |
| 5,724,593 A | 3/1998 | Hargrave, III et al. | |
| 5,727,165 A | 3/1998 | Ordish et al. | |
| 5,758,126 A | 5/1998 | Daniels et al. | |
| 5,771,291 A | 6/1998 | Newton et al. | |
| 5,771,380 A | 6/1998 | Tanaka et al. | |
| 5,778,213 A | 7/1998 | Shakib et al. | |
| 5,778,356 A | 7/1998 | Heiny | |
| 5,787,386 A | 7/1998 | Kaplan et al. | |
| 5,790,790 A | 8/1998 | Smith et al. | |
| 5,794,219 A | 8/1998 | Brown | |
| 5,799,285 A | 8/1998 | Klingman | |
| 5,803,500 A | 9/1998 | Mossberg | |
| 5,818,914 A | 10/1998 | Fujisaki | |
| 5,826,244 A | 10/1998 | Huberman | |
| 5,835,896 A | 11/1998 | Fisher et al. | |
| 5,835,911 A | 11/1998 | Nakagawa et al. | |
| 5,845,143 A | 12/1998 | Yamauchi et al. | |
| 5,845,265 A | 12/1998 | Woolston | |
| 5,845,266 A | 12/1998 | Lupien et al. | |
| 5,846,265 A | 12/1998 | McGregor et al. | |
| 5,850,442 A | 12/1998 | Muftic | |
| 5,854,997 A | 12/1998 | Sukeda et al. | |
| 5,857,188 A | 1/1999 | Douglas | |
| 5,857,201 A | 1/1999 | Wright et al. | |
| 5,857,203 A | 1/1999 | Kauffman et al. | |
| 5,870,722 A | 2/1999 | Albert et al. | |
| 5,872,848 A | 2/1999 | Romney et al. | |
| 5,873,069 A | 2/1999 | Reuhl et al. | |
| 5,874,412 A | 2/1999 | Priebe et al. | |
| 5,884,056 A | 3/1999 | Steele | |
| 5,884,246 A | 3/1999 | Boucher et al. | |
| 5,884,247 A | 3/1999 | Christy | |
| 5,890,138 A | 3/1999 | Godin et al. | |
| 5,905,974 A | 5/1999 | Fraser et al. | |
| 5,905,975 A | 5/1999 | Ausubel | |
| 5,909,544 A | 6/1999 | Anderson et al. | |
| 5,917,484 A | 6/1999 | Mullaney | |
| 5,922,074 A | 7/1999 | Richard et al. | |
| 5,924,072 A | 7/1999 | Havens | |
| 5,926,794 A | 7/1999 | Fethe | |
| 5,944,790 A | 8/1999 | Levy | |
| 5,960,382 A | 9/1999 | Steiner | |
| 5,966,685 A | 10/1999 | Flanagan et al. | |
| 5,974,412 A | 10/1999 | Hazlehurst et al. | |
| 5,991,739 A | 11/1999 | Cupps et al. | |
| 6,006,221 A | 12/1999 | Liddy et al. | |
| 6,018,742 A | 1/2000 | Herbert, III | |
| 6,035,288 A | 3/2000 | Solomon | |
| 6,035,402 A | 3/2000 | Vaeth et al. | |
| 6,044,363 A | 3/2000 | Mori et al. | |
| 6,047,264 A | 4/2000 | Fisher et al. | |
| 6,055,518 A | 4/2000 | Franklin et al. | |
| 6,058,379 A | 5/2000 | Odom et al. | |
| 6,058,417 A | 5/2000 | Hess et al. | |
| 6,061,448 A | 5/2000 | Smith et al. | |
| 6,069,939 A | 5/2000 | Fung et al. | |
| 6,073,117 A | 6/2000 | Oyanagi et al. | |
| 6,077,085 A | 6/2000 | Parry et al. | |
| 6,085,169 A | 7/2000 | Walker et al. | |
| 6,085,176 A | 7/2000 | Woolston | |
| 6,092,035 A | 7/2000 | Kurachi et al. | |
| 6,092,037 A | 7/2000 | Stone et al. | |
| 6,104,815 A | 8/2000 | Alcorn et al. | |
| 6,119,137 A | 9/2000 | Smith et al. | |
| 6,119,229 A | 9/2000 | Martinez et al. | |
| 6,122,606 A | 9/2000 | Johnson | |
| 6,134,533 A | 10/2000 | Shell | |
| 6,141,653 A | 10/2000 | Conklin et al. | |
| 6,144,984 A | 11/2000 | DeBenedictis et al. | |
| 6,151,589 A | 11/2000 | Aggarwal et al. | |
| 6,161,082 A | 12/2000 | Goldberg et al. | |
| 6,178,408 B1 | 1/2001 | Copple et al. | |
| 6,192,407 B1 | 2/2001 | Smith et al. | |
| 6,202,051 B1 | 3/2001 | Woolston | |
| 6,205,418 B1 | 3/2001 | Li et al. | |
| 6,226,412 B1 | 5/2001 | Schwab | |
| 6,243,691 B1 | 6/2001 | Fisher et al. | |
| 6,266,651 B1 | 7/2001 | Woolston | |

(56) References Cited

U.S. PATENT DOCUMENTS

| | | |
|---|---|---|
| 6,266,652 B1 | 7/2001 | Godin et al. |
| 6,272,675 B1 | 8/2001 | Schrab et al. |
| 6,275,789 B1 | 8/2001 | Moser et al. |
| 6,278,969 B1 | 8/2001 | King et al. |
| 6,282,507 B1 | 8/2001 | Horiguchi et al. |
| 6,292,769 B1 | 9/2001 | Flanagan et al. |
| 6,301,554 B1 | 10/2001 | Christy |
| 6,308,172 B1 | 10/2001 | Agrawal et al. |
| 6,317,727 B1 | 11/2001 | May |
| 6,326,985 B1 | 12/2001 | Tazoe et al. |
| 6,336,105 B1 | 1/2002 | Conklin et al. |
| 6,339,755 B1 | 1/2002 | Hetherington et al. |
| 6,341,958 B1 | 1/2002 | Zilberman |
| 6,349,275 B1 | 2/2002 | Schumacher et al. |
| 6,356,865 B1 | 3/2002 | Franz et al. |
| 6,363,337 B1 | 3/2002 | Amith |
| 6,389,427 B1 | 5/2002 | Faulkner |
| 6,396,515 B1 | 5/2002 | Hetherington et al. |
| 6,415,270 B1 | 7/2002 | Rackson et al. |
| 6,421,653 B1 | 7/2002 | May |
| 6,438,524 B1 | 8/2002 | Shi |
| 6,446,048 B1 | 9/2002 | Wells et al. |
| 6,460,015 B1 | 10/2002 | Hetherington et al. |
| 6,463,404 B1 | 10/2002 | Appleby |
| 6,473,729 B1 | 10/2002 | Gastaldo et al. |
| 6,493,661 B1 | 12/2002 | White, III et al. |
| 6,496,793 B1 | 12/2002 | Veditz et al. |
| 6,507,813 B2 | 1/2003 | Veditz et al. |
| 6,523,000 B1 | 2/2003 | Ando et al. |
| 6,526,426 B1 | 2/2003 | Lakritz |
| 6,532,444 B1 | 3/2003 | Weber |
| 6,549,922 B1 | 4/2003 | Srivastava et al. |
| 6,567,821 B1 | 5/2003 | Polk |
| 6,570,591 B1 | 5/2003 | Crovetto et al. |
| 6,571,241 B1 | 5/2003 | Nosohara |
| 6,574,239 B1 | 6/2003 | Dowling et al. |
| 6,598,026 B1 | 7/2003 | Ojha et al. |
| 6,604,107 B1 | 8/2003 | Wang |
| 6,616,703 B1 | 9/2003 | Nakagawa |
| 6,623,529 B1 | 9/2003 | Lakritz |
| 6,647,364 B1 | 11/2003 | Yumura et al. |
| 6,647,373 B1 | 11/2003 | Carlton-Foss |
| 6,651,220 B1 | 11/2003 | Penteroudakis et al. |
| 6,665,676 B2 | 12/2003 | Twig et al. |
| 6,701,314 B1 | 3/2004 | Conover et al. |
| 6,721,715 B2 | 4/2004 | Nemzow |
| 6,732,161 B1 | 5/2004 | Hess et al. |
| 6,771,291 B1 | 8/2004 | DiStefano |
| 6,799,165 B1 | 9/2004 | Boesjes |
| 6,857,022 B1 | 2/2005 | Scanlan |
| 6,901,408 B2 | 5/2005 | Fachat et al. |
| 6,912,539 B1 | 6/2005 | Kapitanski et al. |
| 6,965,882 B1 | 11/2005 | Lapstun et al. |
| 6,999,932 B1 | 2/2006 | Zhou |
| 7,007,026 B2 | 2/2006 | Wilkinson et al. |
| 7,013,289 B2 | 3/2006 | Horn et al. |
| 7,031,985 B1 | 4/2006 | Pecheny |
| 7,072,826 B1 | 7/2006 | Wakita |
| 7,076,453 B2 | 7/2006 | Jammes et al. |
| 7,133,835 B1 | 11/2006 | Fusz et al. |
| 7,136,863 B2 | 11/2006 | Wang |
| 7,165,041 B1 | 1/2007 | Guheen et al. |
| 7,191,393 B1 | 3/2007 | Chin et al. |
| 7,194,403 B1 | 3/2007 | Okura et al. |
| 7,234,110 B2 | 6/2007 | Sumitomo |
| 7,251,612 B1 | 7/2007 | Parker et al. |
| 7,315,613 B2 | 1/2008 | Kleindienst et al. |
| 7,315,826 B1 | 1/2008 | Guheen et al. |
| 7,337,133 B1 | 2/2008 | Bezos et al. |
| 7,340,389 B2 | 3/2008 | Vargas |
| 7,418,390 B1 | 8/2008 | Jokipii |
| 7,660,740 B2 | 2/2010 | Boone et al. |
| 7,752,034 B2 | 7/2010 | Brockett et al. |
| 7,752,266 B2 | 7/2010 | Grove |
| 7,895,082 B2 | 2/2011 | Veres et al. |
| 7,908,132 B2 | 3/2011 | Brockett et al. |
| 7,941,348 B2 | 5/2011 | Veres et al. |
| 8,050,957 B2 | 11/2011 | Woehler |
| 8,078,505 B2 | 12/2011 | Veres et al. |
| 8,255,286 B2 | 8/2012 | Veres et al. |
| 8,266,016 B2 | 9/2012 | Boone et al. |
| 8,442,871 B2 | 5/2013 | Veres et al. |
| 8,639,829 B2 | 1/2014 | Grove |
| 8,719,041 B2 | 5/2014 | Veres et al. |
| 8,732,037 B2 | 5/2014 | Boone et al. |
| 9,092,792 B2 | 7/2015 | Veres et al. |
| 9,189,568 B2 | 11/2015 | Munro et al. |
| 2001/0011241 A1 | 8/2001 | Nemzow |
| 2001/0029442 A1 | 10/2001 | Shiotsu et al. |
| 2001/0029455 A1* | 10/2001 | Chin ............... G06F 17/273 704/277 |
| 2001/0039531 A1 | 11/2001 | Aoki |
| 2001/0049707 A1 | 12/2001 | Tran |
| 2002/0019837 A1* | 2/2002 | Balnaves ......... G06F 17/30893 715/207 |
| 2002/0029182 A1 | 3/2002 | Nakagawa |
| 2002/0035466 A1 | 3/2002 | Kodama |
| 2002/0042835 A1 | 4/2002 | Pepin et al. |
| 2002/0046137 A1 | 4/2002 | Odom et al. |
| 2002/0069049 A1 | 6/2002 | Turner |
| 2002/0073111 A1 | 6/2002 | Heyliger |
| 2002/0082953 A1 | 6/2002 | Batham et al. |
| 2002/0082977 A1 | 6/2002 | Hammond et al. |
| 2002/0087661 A1* | 7/2002 | Matichuk ............ B60P 3/34 709/218 |
| 2002/0099562 A1 | 7/2002 | Bruce et al. |
| 2002/0116318 A1 | 8/2002 | Thomas et al. |
| 2002/0123959 A1 | 9/2002 | Mozley et al. |
| 2002/0147656 A1 | 10/2002 | Tam et al. |
| 2002/0147790 A1 | 10/2002 | Snow |
| 2002/0174010 A1 | 11/2002 | Rice |
| 2002/0184610 A1 | 12/2002 | Chong et al. |
| 2002/0188670 A1 | 12/2002 | Stringham |
| 2002/0193986 A1 | 12/2002 | Schirris |
| 2002/0198713 A1 | 12/2002 | Franz et al. |
| 2003/0005159 A1 | 1/2003 | Kumhyr |
| 2003/0018885 A1 | 1/2003 | Landsman et al. |
| 2003/0033137 A1 | 2/2003 | Holubar et al. |
| 2003/0041014 A1 | 2/2003 | Grey et al. |
| 2003/0046059 A1 | 3/2003 | Litster et al. |
| 2003/0055747 A1 | 3/2003 | Carr et al. |
| 2003/0069829 A1 | 4/2003 | Gathman et al. |
| 2003/0074462 A1 | 4/2003 | Grove |
| 2003/0078033 A1 | 4/2003 | Sauer et al. |
| 2003/0083952 A1 | 5/2003 | Simpson et al. |
| 2003/0084051 A1 | 5/2003 | Depura et al. |
| 2003/0088566 A1 | 5/2003 | Wang |
| 2003/0093326 A1 | 5/2003 | Poon et al. |
| 2003/0110047 A1 | 6/2003 | Santosuosso et al. |
| 2003/0139975 A1 | 7/2003 | Perkowski |
| 2003/0154134 A1 | 8/2003 | Wang |
| 2003/0167213 A1 | 9/2003 | Jammes et al. |
| 2003/0208352 A1 | 11/2003 | Lee |
| 2003/0229545 A1 | 12/2003 | Veres et al. |
| 2003/0229554 A1 | 12/2003 | Veres et al. |
| 2004/0001106 A1 | 1/2004 | Deutscher et al. |
| 2004/0073507 A1 | 4/2004 | Scott et al. |
| 2004/0078297 A1 | 4/2004 | Veres et al. |
| 2005/0102151 A1 | 5/2005 | Fuwa et al. |
| 2005/0240392 A1 | 10/2005 | Munro et al. |
| 2006/0074792 A1 | 4/2006 | Wagoner et al. |
| 2006/0200353 A1 | 9/2006 | Bennett |
| 2007/0112643 A1 | 5/2007 | Veres et al. |
| 2008/0152095 A1 | 6/2008 | Kleindienst et al. |
| 2010/0131510 A1 | 5/2010 | Boone et al. |
| 2010/0228536 A1 | 9/2010 | Grove |
| 2011/0231530 A1 | 9/2011 | Veres et al. |
| 2012/0047029 A1 | 2/2012 | Veres et al. |
| 2012/0246233 A1 | 9/2012 | Veres et al. |
| 2012/0284304 A1 | 11/2012 | Boone et al. |
| 2014/0297459 A1 | 10/2014 | Boone et al. |
| 2014/0297461 A1 | 10/2014 | Boone et al. |
| 2014/0297462 A1 | 10/2014 | Boone et al. |
| 2014/0297463 A1 | 10/2014 | Boone et al. |

(56) References Cited

U.S. PATENT DOCUMENTS

| | | | |
|---|---|---|---|
| 2014/0297464 | A1 | 10/2014 | Boone et al. |
| 2014/0297475 | A1 | 10/2014 | Boone et al. |
| 2014/0297482 | A1 | 10/2014 | Boone et al. |
| 2014/0297483 | A1 | 10/2014 | Boone et al. |
| 2014/0297484 | A1 | 10/2014 | Boone et al. |
| 2014/0304120 | A1 | 10/2014 | Boone et al. |
| 2014/0324594 | A1 | 10/2014 | Veres et al. |
| 2015/0127502 | A1 | 5/2015 | Knepfle et al. |
| 2015/0371322 | A1 | 12/2015 | Veres et al. |
| 2016/0071181 | A1 | 3/2016 | Munro et al. |

FOREIGN PATENT DOCUMENTS

| | | | |
|---|---|---|---|
| CN | 102129642 | A | 7/2011 |
| FR | 2658635 | A1 | 8/1991 |
| GB | 2295474 | A | 5/1996 |
| JP | 2000322490 | A | 11/2000 |
| JP | 2001000469 | A | 1/2001 |
| JP | 2002207898 | A | 7/2002 |
| JP | 2004094643 | A | 3/2004 |
| KR | 20000018041 | A | 4/2000 |
| KR | 20000024372 | A | 5/2000 |
| KR | 20000049744 | A | 8/2000 |
| KR | 20020059971 | A | 7/2002 |
| KR | 20000037395 | A | 4/2008 |
| NL | 9300266 | A | 9/1994 |
| WO | WO-9215174 | A1 | 9/1992 |
| WO | WO-9517711 | A1 | 6/1995 |
| WO | WO-9634356 | A1 | 10/1996 |
| WO | WO-9737315 | A1 | 10/1997 |
| WO | WO-9963461 | A1 | 12/1999 |
| WO | WO-0058862 | A2 | 10/2000 |
| WO | WO-0102926 | A2 | 1/2001 |
| WO | WO-0157722 | A1 | 8/2001 |
| WO | WO-0182115 | A1 | 11/2001 |
| WO | WO-0233618 | A1 | 4/2002 |
| WO | WO-03038560 | A2 | 5/2003 |
| WO | WO-03104931 | A3 | 12/2003 |

OTHER PUBLICATIONS

"U.S. Appl. No. 10/252,129, Final Office Action mailed Apr. 22, 2015", 35 pgs.
"U.S. Appl. No. 10/252,129, Response filed Jul. 10, 2015 to Final Office Action mailed Apr. 22, 2015", 21 pgs.
"U.S. Appl. No. 10/831,421, Examiner Interview Summary mailed May 13, 2015", 3 pgs.
"U.S. Appl. No. 10/831,421, Notice of Allowance mailed Jul. 10, 2015", 10 pgs.
"U.S. Appl. No. 10/831,421, Response filed May 11, 2015 to Non Final Office Action mailed Feb. 9, 2015", 11 pgs.
"U.S. Appl. No. 13/285,916, Notice of Allowance mailed Mar. 3, 2015", 5 pgs.
"U.S. Appl. No. 13/285,916, PTO Response to Rule 312 Communication mailed Jun. 9, 2015", 2 pgs.
"U.S. Appl. No. 13/285,916, Supplemental Notice of Allowability mailed Apr. 1, 2015", 4 pgs.
"U.S. Appl. No. 13/285,916, Supplemental Notice of Allowability mailed Jun. 18, 2015", 4 pgs.
"U.S. Appl. No. 14/231,624, Non Final Office Action mailed May 22, 2015", 19 pgs.
"U.S. Appl. No. 14/231,624, Response filed Aug. 22, 2015 to Non Final Office Action mailed May 22, 2015", 12 pgs.
"U.S. Appl. No. 14/231,633, Non Final Office Action mailed Mar. 24, 2015", 16 pgs.
"U.S. Appl. No. 14/231,633, Response filed Aug. 8, 2015 to Non Final Office Action mailed Mar. 24, 2015", 11 pgs.
"U.S. Appl. No. 14/231,639, Non Final Office Action mailed Jul. 16, 2015", 19 pgs.
"U.S. Appl. No. 14/231,639, Response filed Aug. 25, 2015 to Non Final Office Action mailed Jul. 16, 2015", 14 pgs.
"U.S. Appl. No. 14/231,650, Non Final Office Action mailed Mar. 3, 2015", 18 pgs.
"U.S. Appl. No. 14/231,650, Response filed Aug. 3, 2015 to Non Final Office Action mailed Mar. 3, 2015", 11 pgs.
"U.S. Appl. No. 14/231,684, Non Final Office Action mailed Mar. 3, 2015", 16 pgs.
"U.S. Appl. No. 14/231,684, Response filed Aug. 3, 2015 to Non Final Office Action mailed Mar. 3, 2015", 10 pgs.
"U.S. Appl. No. 14/231,696, Final Office Action mailed Feb. 24, 2015", 22 pgs.
"U.S. Appl. No. 14/231,696, Response filed Jul. 24, 2015 to Final Office Action mailed Feb. 24, 2015", 12 pgs.
"U.S. Appl. No. 14/231,706, Non Final Office Action mailed Mar. 25, 2015", 15 pgs.
"U.S. Appl. No. 14/231,706, Response filed Jul. 13, 2015 to Non Final Office Action mailed Mar. 25, 2015", 10 pgs.
"U.S. Appl. No. 14/231,719, Final Office Action mailed Feb. 24, 2015", 16 pgs.
"U.S. Appl. No. 14/231,719, Response filed Jul. 13, 2015 to Final Office Action mailed Feb. 24, 2015", 11 pgs.
"U.S. Appl. No. 14/231,722, Non Final Office Action mailed Feb. 25, 2015", 13 pgs.
"U.S. Appl. No. 14/231,722, Response filed Jul. 13, 2015 to Non Final Office Action mailed Feb. 25, 2015", 9 pgs.
"U.S. Appl. No. 14/268,986, Non Final Office Action mailed Jul. 2, 2015", 13 pgs.
"U.S. Appl. No. 14/595,074, First Office Action Interview Office Action Summary mailed Jun. 22, 2015", 4 pgs.
"U.S. Appl. No. 14/595,074, Pre-Interview First Office Action mailed Apr. 2, 2015", 4 pgs.
"U.S. Appl. No. 14/595,074, Response filed Jun. 2, 2015 to First Office Action Interview Pilot Program Pre-Interview mailed Apr. 2, 2015", 2 pgs.
"U.S. Appl. No. 14/595,074, Response filed Aug. 24, 2015 to First Action Interview Office Action Summary mailed Jun. 22, 2015", 18 pgs.
"U.S. Appl. No. 14/790,661, Preliminary Amendment filed Jul. 6, 2015", 7 pgs.
"Stamp.com Launches New iShip Service Offering to Automate Office-Based Shipping", PR Newswire, PQDialog #448531788, (Jun. 14, 2000), 5 pgs.
"Stamp.com Launches New iShip Service Offering to Automate Office-Based Shipping", PR Newswire, PQDialog #448531788, (Jun. 14, 2000), 7 pgs.
"Yahoo! Launches Yahoo! Pay-direct for Online Person-to-Person Payments; Relationship With CIBC National Bank Allows Consumers to Easily Send and Receive Payments via Email", Business Wire, PQ Dialog #445932440, (Jul. 31, 2000), 4 pgs.
"U.S. Appl. No. 14/231,624, Final Office Action mailed Oct. 22, 2015", 28 pgs.
"U.S. Appl. No. 14/231,633, Final Office Action mailed Oct. 16, 2015", 25 pgs.
"U.S. Appl. No. 14/231,639, Final Office Action mailed Oct. 23, 2015", 28 pgs.
"U.S. Appl. No. 14/231,650, Final Office Action mailed Oct. 23, 2015", 28 pgs.
"U.S. Appl. No. 14/231,684, Final Office Action mailed Oct. 28, 2015", 26 pgs.
"U.S. Appl. No. 14/231,696, Non Final Office Action mailed Oct. 22, 2015", 29 pgs.
"U.S. Appl. No. 14/231,706, Final Office Action mailed Oct. 14, 2015", 29 pgs.
"U.S. Appl. No. 14/231,722, Final Office Action mailed Oct. 21, 2015", 26 pgs.
"U.S. Appl. No. 14/268,986, Response filed Oct. 2, 2015 to Non Final Office Action mailed Jul. 2, 2015", 10 pgs.
"Andale Lister", Copyright © 2002 Andale Inc., [Online]. [archived Oct. 25, 2002]. Retrieved from the Internet: <URL: http://web.archive.org/web/20021025121452/http://www.andale.com/corp/products/sell.jsp>, (2002), 3 pgs.
"Andale Lister: Bulk List", Copyright © 2002 Andale Inc., [Online]. [Archived Oct. 5, 2002]. Retrieved from the Internet: <URL:

(56) References Cited

OTHER PUBLICATIONS http://web.archive.org/web/20021005074745/http://www.andale.com/corp/products/qs_sell_details_bulklist.jsp>, (2002), 1 pg.

"Andale lister: Design Center", Copyright © 2002 Andale Inc., [Online]. [Archived Dec. 15, 2004]. Retrieved from the Internet: <URL: http://web.archive.org/web/20021215192044/http://www.andale.com/corp/products/qs_sell_details_designcenter.jsp>, (2004), 1 pg.

"Andale Lister: In-Line Images", Copyright © 2002 Andale Inc., [Online]. [Archived Dec. 15, 2002]. Retrieved from the Internet: <URL: http://web.archive.org/web/20021215192408/http://www.andale.com/corp/products/qs_sell_details_inlineimg.jsp>, (2002), 1 pg.

"Andale Lister: Inventory Dashboard", Copyright © 2002 Andale Inc., [Online]. [Archived Dec. 15, 2002]. Retrieved from the Internet: <URL: http://web.archive.org/web/20021215192408/http://www.andale.com/corp/products/qs_sell_details_invdashboard.jsp, (2002), 2 pgs.

"Andale Lister: Launch Scheduler", Copyright © 2002 Andale Inc., [Online]. [Archived Dec. 15, 2002]. Retrieved from the Internet: <URL: http://web.archive.org/web/20021215192724/http://www.andale.com/corp/products/qs_sell_details_launchsched.jsp, (2002), 1 pg.

"Andale Lister: Online or Offline", Copyright © 2002 Andale Inc., [Online]. [Archived Dec. 15, 2002]. Retrieved from the Internet: <URL: http://web.archive.org/web/20021215194722/http://www.andale.com/corp/products/qs_sell_details_onoffline.jsp>, (2002), 2 pgs.

"Andale Lister: Overview", Copyright © 2002 Andale Inc., [Online]. [Archived Dec. 1, 2002]. Retrieved from the Internet: <URL: http://web.archive.org/web/20021201081906/http://www.andale.com/corp/products/qs_overview.jsp, (2002), 4 pgs.

"U.S. Appl. No. 09/602,110, Advisory Action mailed Feb. 22, 2013", 3 pgs.

"U.S. Appl. No. 09/602,110, Advisory Action mailed May 26, 2006", 3 pgs.

"U.S. Appl. No. 09/602,110, Amendment filed Apr. 28, 2008", 17 pgs.

"U.S. Appl. No. 09/602,110, Appeal Brief filed Apr. 26, 2010", 37 pgs.

"U.S. Appl. No. 09/602,110, Appeal Brief filed Dec. 15, 2006", 34 pgs.

"U.S. Appl. No. 09/602,110, Appeal Decision mailed Feb. 28, 2008", 13 pgs.

"U.S. Appl. No. 09/602,110, Appeal Decision mailed May 29, 2013", 10 pgs.

"U.S. Appl. No. 09/602,110, Decision on Pre-Appeal Brief mailed Mar. 28, 2014", 2 pgs.

"U.S. Appl. No. 09/602,110, Decision on Pre-Appeal Brief mailed Aug. 15, 2006", 2 pgs.

"U.S. Appl. No. 09/602,110, Examiner's Answer to Appeal Brief mailed Mar. 7, 2007", 13 pgs.

"U.S. Appl. No. 09/602,110, Examiner's Answer to Appeal Brief mailed Jun. 11, 2010", 20 pgs.

"U.S. Appl. No. 09/602,110, Final Office Action mailed Mar. 8, 2006", 11 pgs.

"U.S. Appl. No. 09/602,110, Final Office Action mailed Sep. 2, 2004", 13 pgs.

"U.S. Appl. No. 09/602,110, Final Office Action mailed Nov. 17, 2008", 12 pgs.

"U.S. Appl. No. 09/602,110, Final Office Action mailed Nov. 21, 2005", 11 pgs.

"U.S. Appl. No. 09/602,110, Final Office Action mailed Nov. 25, 2009", 17 pgs.

"U.S. Appl. No. 09/602,110, Final Office Action mailed Nov. 25, 2013", 18 pgs.

"U.S. Appl. No. 09/602,110, Non Final Office Action mailed Jan. 21, 2004", 13 pgs.

"U.S. Appl. No. 09/602,110, Non Final Office Action mailed Apr. 5, 2005", 11 pgs.

"U.S. Appl. No. 09/602,110, Non Final Office Action mailed Aug. 14, 2013", 20 pgs.

"U.S. Appl. No. 09/602,110, Non-Final Office Action mailed Mar. 18, 2009", 19 pgs.

"U.S. Appl. No. 09/602,110, Non-Final Office Action mailed Jul. 21, 2008", 12 pgs.

"U.S. Appl. No. 09/602,110, Pre-Appeal Brief Request filed Mar. 20, 2014", 5 pgs.

"U.S. Appl. No. 09/602,110, Pre-Appeal Brief Request filed Jun. 27, 2006", 4 pgs.

"U.S. Appl. No. 09/602,110, Reply Brief filed May 7, 2007", 11 pgs.

"U.S. Appl. No. 09/602,110, Reply Brief filed Aug. 11, 2010", 6 pgs.

"U.S. Appl. No. 09/602,110, Response filed Jan. 3, 2005 to Final Office Action mailed Sep. 2, 2004", 16 pgs.

"U.S. Appl. No. 09/602,110, Response filed Jan. 23, 2006 to Final Office Action mailed Nov. 21, 2005", 15 pgs.

"U.S. Appl. No. 09/602,110, Response filed Jan. 25, 2010 to Final Office Action mailed Nov. 25, 2009", 22 pgs.

"U.S. Appl. No. 09/602,110, Response filed Feb. 17, 2009 to Final Office Action mailed Nov. 17, 2008", 21 pgs.

"U.S. Appl. No. 09/602,110, Response filed May 8, 2006 to Final Office Action mailed Mar. 8, 2006", 17 pgs.

"U.S. Appl. No. 09/602,110, Response filed May 21, 2004 to Non-Final Office Action mailed Jan. 21, 2004", 18 pgs.

"U.S. Appl. No. 09/602,110, Response filed Jul. 20, 2009 to Non Final Office Action mailed Mar. 18, 2009", 21 pgs.

"U.S. Appl. No. 09/602,110, Response filed Aug. 4, 2005 to Non Final Office Action mailed Apr. 5, 2005", 19 pgs.

"U.S. Appl. No. 09/602,110, Response filed Oct. 21, 2008 to Non-Final Office Action mailed Jul. 21, 2008", 19 pgs.

"U.S. Appl. No. 09/602,110, Response filed Nov. 14, 2013 to Non Final Office Action mailed Aug. 14, 2013", 21 pgs.

"U.S. Appl. No. 09/905,525, Advisory Action mailed May 2, 2008", 5 pgs.

"U.S. Appl. No. 09/905,525, Final Office Action mailed Jan. 10, 2008", 15 pgs.

"U.S. Appl. No. 09/905,525, Final Office Action mailed Jun. 29, 2006", 14 pgs.

"U.S. Appl. No. 09/905,525, Non Final Office Action mailed Jun. 25, 2007", 16 pgs.

"U.S. Appl. No. 09/905,525, Non Final Office Action mailed Dec. 12, 2005", 12 pgs.

"U.S. Appl. No. 09/905,525, Non Final Office Action mailed Dec. 14, 2004", 11 pgs.

"U.S. Appl. No. 09/905,525, Non Final Office Action mailed Dec. 18, 2006", 15 pgs.

"U.S. Appl. No. 09/905,525, Non-Final Office Action mailed Mar. 5, 2009", 25 pgs.

"U.S. Appl. No. 09/905,525, Non-Final Office Action mailed Aug. 22, 2008", 17 pgs.

"U.S. Appl. No. 09/905,525, Notice of Allowance mailed Sep. 18, 2009", 12 pgs.

"U.S. Appl. No. 09/905,525, Response filed Mar. 19, 2007 to Non Final Office Action mailed Dec. 18, 2006", 9 pgs.

"U.S. Appl. No. 09/905,525, Response filed Mar. 27, 2008 to Non Final Office Action mailed Jan. 10, 2008", 17 pgs.

"U.S. Appl. No. 09/905,525, Response filed Apr. 12, 2006 to Non Final Office Action mailed Dec. 12, 2005", 8 pgs.

"U.S. Appl. No. 09/905,525, Response filed Apr. 12, 2006 to Non Final Office Action mailed Dec. 12, 2005", 17 pgs.

"U.S. Appl. No. 09/905,525, Response filed Jun. 5, 2009 to Non Final Office Action mailed Mar. 5, 2009", 19 pgs.

"U.S. Appl. No. 09/905,525, Response filed Jun. 10, 2008 to Advisory Action mailed May 2, 2008", 20 pgs.

"U.S. Appl. No. 09/905,525, Response filed Sep. 22, 2006 to Final Office Action mailed Jun. 29, 2006", 19 pgs.

"U.S. Appl. No. 09/905,525, Response filed Sep. 25, 2007 to Non Final Office Action mailed Jun. 25, 2007", 17 pgs.

"U.S. Appl. No. 09/905,525, Response filed Nov. 24, 2008 to Non Final Office Action mailed Aug. 22, 2008", 17 pgs.

"U.S. Appl. No. 09/976,301, 312 Amendment filed Jan. 10, 2010", 4 pgs.

(56) References Cited

OTHER PUBLICATIONS

"U.S. Appl. No. 09/976,301, Advisory Action mailed Jun. 9, 2008", 5 pgs.
"U.S. Appl. No. 09/976,301, Advisory Action mailed Aug. 13, 2009", 3 pgs.
"U.S. Appl. No. 09/976,301, Advisory Action mailed Sep. 30, 2005", 3 pgs.
"U.S. Appl. No. 09/976,301, Advisory Action mailed Nov. 30, 2006", 3 pgs.
"U.S. Appl. No. 09/976,301, Decision on Pre-Appeal Brief mailed Jul. 29, 2008", 2 pgs.
"U.S. Appl. No. 09/976,301, Examiner Interview Summary mailed Sep. 9, 2009", 4 pgs.
"U.S. Appl. No. 09/976,301, Examiner Interview Summary mailed Dec. 8, 2006", 4 pgs.
"U.S. Appl. No. 09/976,301, Final Office Action mailed Mar. 17, 2008", 14 pgs.
"U.S. Appl. No. 09/976,301, Final Office Action mailed Jun. 4, 2009", 15 pgs.
"U.S. Appl. No. 09/976,301, Final Office Action mailed Jul. 13, 2005", 11 pgs.
"U.S. Appl. No. 09/976,301, Final Office Action mailed Aug. 25, 2006", 14 pgs.
"U.S. Appl. No. 09/976,301, Non Final Office Action mailed Mar. 9, 2007", 13 pgs.
"U.S. Appl. No. 09/976,301, Non Final Office Action mailed Sep. 13, 2007", 12 pgs.
"U.S. Appl. No. 09/976,301, Non Final Office Action mailed Nov. 24, 2004", 31 pgs.
"U.S. Appl. No. 09/976,301, Non Final Office Action mailed Dec. 16, 2005", 17 pgs.
"U.S. Appl. No. 09/976,301, Non-Final Office Action mailed Dec. 23, 2008", 23 pgs.
"U.S. Appl. No. 09/976,301, Notice of Allowance mailed Dec. 2, 2009", 13 pgs.
"U.S. Appl. No. 09/976,301, Pre-Appeal Brief Request filed Jun. 16, 2008", 5 pgs.
"U.S. Appl. No. 09/976,301, PTO Response to 312 Amendment mailed Feb. 3, 2010", 2 pgs.
"U.S. Appl. No. 09/976,301, Response filed Mar. 23, 2009 to Non Final Office Action mailed Dec. 23, 2008", 19 pgs.
"U.S. Appl. No. 09/976,301, Response filed Apr. 6, 2005 to Non Final Office Action mailed Nov. 24, 2004", 15 pgs.
"U.S. Appl. No. 09/976,301, Response filed May 16, 2006 to Non Final Office Action mailed Dec. 16, 2005", 24 pgs.
"U.S. Appl. No. 09/976,301, Response filed May 19, 2008 to Final Office Action mailed Mar. 17, 2008", 19 pgs.
"U.S. Appl. No. 09/976,301, Response filed Jun. 7, 2007 to Non Final Office Action mailed Mar. 9, 2007", 7 pgs.
"U.S. Appl. No. 09/976,301, Response filed Aug. 4, 2009 to Final Office Action mailed Jun. 4, 2009", 15 pgs.
"U.S. Appl. No. 09/976,301, Response filed Sep. 4, 2009 to Final Office Action mailed Jun. 4, 2009", 20 pgs.
"U.S. Appl. No. 09/976,301, Response filed Sep. 13, 2005 to Final Office Action mailed Jul. 13, 2005", 13 pgs.
"U.S. Appl. No. 09/976,301, Response filed Sep. 29, 2008 to Final Office Action mailed Mar. 17, 2008", 19 pgs.
"U.S. Appl. No. 09/976,301, Response filed Oct. 13, 2005 to Advisory Action mailed Sep. 30, 2005", 14 pgs.
"U.S. Appl. No. 09/976,301, Response filed Oct. 24, 2006 to Final Office Action mailed Aug. 25, 2006", 6 pgs.
"U.S. Appl. No. 09/976,301, Response filed Dec. 13, 2007 to Non-Final Office Action mailed Sep. 13, 2007", 17 pgs.
"U.S. Appl. No. 09/976,301, Response filed Dec. 20, 2006 to Advisory Action mailed Nov. 30, 2006", 16 pgs.
"U.S. Appl. No. 10/252,126, Appeal Brief filed Feb. 4, 2009", 22 pgs.
"U.S. Appl. No. 10/252,126, Decision on Appeal mailed Sep. 15, 2010", 8 pgs.
"U.S. Appl. No. 10/252,126, Examiner Interview Summary mailed Oct. 26, 2007", 1 pg.
"U.S. Appl. No. 10/252,126, Examiner's Answer to Appeal Brief mailed Apr. 29, 2009", 12 pgs.
"U.S. Appl. No. 10/252,126, Final Office Action mailed Feb. 26, 2008", 12 pgs.
"U.S. Appl. No. 10/252,126, Final Office Action mailed Jun. 27, 2006", 11 pgs.
"U.S. Appl. No. 10/252,126, Final Office Action mailed Sep. 4, 2008", 13 pgs.
"U.S. Appl. No. 10/252,126, Non Final Office Action mailed Jan. 30, 2007", 9 pgs.
"U.S. Appl. No. 10/252,126, Non Final Office Action mailed Feb. 3, 2006", 8 pgs.
"U.S. Appl. No. 10/252,126, Non Final Office Action mailed Aug. 20, 2007", 8 pgs.
"U.S. Appl. No. 10/252,126, Notice of Allowance mailed Dec. 30, 2010", 13 pgs.
"U.S. Appl. No. 10/252,126, Response filed May 3, 2006 to Non Final Office Action mailed Feb. 3, 2006", 7 pgs.
"U.S. Appl. No. 10/252,126, Response filed Jun. 25, 2007 to Non Final Office Action mailed Jan. 30, 2007", 11 pgs.
"U.S. Appl. No. 10/252,126, Response filed Jul. 28, 2008 to Final Office Action mailed Feb. 26, 2008", 7 pgs.
"U.S. Appl. No. 10/252,126, Response filed Oct. 27, 2006 to Final Office Action mailed Jun. 27, 2006", 8 pgs.
"U.S. Appl. No. 10/252,126, Response filed Dec. 20, 2007 to Non-Final Office Action mailed Aug. 20, 2007", 8 pgs.
"U.S. Appl. No. 10/252,126, Response filed Dec. 29, 2005 to Restriction Requirement mailed Oct. 31, 2005", 5 pgs.
"U.S. Appl. No. 10/252,126, Restriction Requirement mailed Oct. 31, 2005", 7 pgs.
"U.S. Appl. No. 10/252,127, Advisory Action mailed Jan. 10, 2007", 3 pgs.
"U.S. Appl. No. 10/252,127, Advisory Action mailed Mar. 29, 2010", 3 pgs.
"U.S. Appl. No. 10/252,127, Advisory Action mailed May 1, 2008", 3 pgs.
"U.S. Appl. No. 10/252,127, Advisory Action mailed Dec. 12, 2008", 3 pgs.
"U.S. Appl. No. 10/252,127, Appeal Brief filed Mar. 11, 2009", 27 pgs.
"U.S. Appl. No. 10/252,127, Applicant's Summary of Examiner Interview filed Apr. 15, 2011", 2 pgs.
"U.S. Appl. No. 10/252,127, Decision on Pre-Appeal Brief mailed Feb. 11, 2009", 2 pgs.
"U.S. Appl. No. 10/252,127, Decision on Pre-Appeal Brief mailed May 12, 2008", 2 pgs.
"U.S. Appl. No. 10/252,127, Decision on Pre-Appeal Brief Request mailed May 14, 2010", 2 pgs.
"U.S. Appl. No. 10/252,127, Final Office Action mailed Jan. 7, 2010", 11 pgs.
"U.S. Appl. No. 10/252,127, Final Office Action mailed Jan. 11, 2008", 11 pgs.
"U.S. Appl. No. 10/252,127, Final Office Action mailed Sep. 4, 2008", 12 pgs.
"U.S. Appl. No. 10/252,127, Final Office Action mailed Oct. 6, 2006", 10 pgs.
"U.S. Appl. No. 10/252,127, Non Final Office Action mailed Mar. 21, 2006", 9 pgs.
"U.S. Appl. No. 10/252,127, Non Final Office Action mailed Jul. 11, 2007", 9 pgs.
"U.S. Appl. No. 10/252,127, Non-Final Office Action mailed Jun. 26, 2009", 14 pgs.
"U.S. Appl. No. 10/252,127, Non-Final Office Action mailed Sep. 10, 2010", 11 pgs.
"U.S. Appl. No. 10/252,127, Notice of Allowance mailed Mar. 18, 2011", 16 pgs.
"U.S. Appl. No. 10/252,127, Notice of Allowance mailed Jul. 28, 2011", 6 pgs.
"U.S. Appl. No. 10/252,127, Pre-Appeal Brief Request filed Jan. 5, 2009", 5 pgs.

(56) References Cited

OTHER PUBLICATIONS

"U.S. Appl. No. 10/252,127, Pre-Appeal Brief Request filed Apr. 7, 2010", 5 pgs.
"U.S. Appl. No. 10/252,127, Pre-Appeal Brief Request filed Apr. 10, 2008", 5 pgs.
"U.S. Appl. No. 10/252,127, Response filed Jan. 14, 2011 to Non Final Office Action mailed Sep. 10, 2010", 18 pgs.
"U.S. Appl. No. 10/252,127, Response filed Mar. 8, 2010 to Final Office Action mailed Jan. 7, 2010", 17 pgs.
"U.S. Appl. No. 10/252,127, Response filed Mar. 27, 2008 to Final Office Action mailed Jan. 11, 2008", 16 pgs.
"U.S. Appl. No. 10/252,127, Response filed Jun. 12, 2008 to Advisory Action mailed May 1, 2008", 16 pgs.
"U.S. Appl. No. 10/252,127, Response filed Jun. 12, 2008 to Final Office Action mailed Jan. 11, 2008", 16 pgs.
"U.S. Appl. No. 10/252,127, Response filed Jun. 21, 2006 to Non Final Office Action mailed Mar. 21, 2006", 8 pgs.
"U.S. Appl. No. 10/252,127, Response filed Sep. 28, 2009 to Non Final Office Action mailed Jun. 26, 2009", 16 pgs.
"U.S. Appl. No. 10/252,127, Response filed Oct. 11, 2007 to Non-Final Office Action mailed Jul. 11, 2007", 15 pgs.
"U.S. Appl. No. 10/252,127, Response filed Nov. 4, 2008 to Final Office Action mailed Sep. 4, 2008", 22 pgs.
"U.S. Appl. No. 10/252,127, Response filed Dec. 6, 2006 to Final Office Action mailed Oct. 6, 2006", 14 pgs.
"U.S. Appl. No. 10/252,128, Appeal Brief filed Dec. 15, 2009", 23 pgs.
"U.S. Appl. No. 10/252,128, Appeal Decision mailed Jan. 31, 2013", 6 pgs.
"U.S. Appl. No. 10/252,128, Decision on Pre-Appeal Brief Request mailed Oct. 15, 2009", 2 pgs.
"U.S. Appl. No. 10/252,128, Examiner's Answer to Appeal Brief mailed Mar. 31, 2010", 11 pgs.
"U.S. Appl. No. 10/252,128, Final Office Action mailed Apr. 3, 2009", 27 pgs.
"U.S. Appl. No. 10/252,128, Non-Final Office Action mailed Mar. 21, 2008", 12 pgs.
"U.S. Appl. No. 10/252,128, Notice of Allowance mailed May 30, 2013", 9 pgs.
"U.S. Appl. No. 10/252,128, Notice of Allowance mailed Dec. 23, 2013", 10 pgs.
"U.S. Appl. No. 10/252,128, Pre-Appeal Brief Request filed Aug. 3, 2009", 4 pgs.
"U.S. Appl. No. 10/252,128, Response filed Jul. 21, 2008 to Non-Final Office Action mailed Mar. 21, 2008", 11 pgs.
"U.S. Appl. No. 10/252,128, Response filed Dec. 23, 2008 to Restriction Requirement mailed Nov. 24, 2008", 10 pgs.
"U.S. Appl. No. 10/252,128, Restriction Requirement mailed Nov. 24, 2008", 8 pgs.
"U.S. Appl. No. 10/252,129, Advisory Action mailed Mar. 13, 2007", 3 pgs.
"U.S. Appl. No. 10/252,129, Advisory Action mailed Sep. 2, 2009", 2 pgs.
"U.S. Appl. No. 10/252,129, Advisory Action mailed Oct. 4, 2010", 3 pgs.
"U.S. Appl. No. 10/252,129, Advisory Action mailed Oct. 6, 2009", 3 pgs.
"U.S. Appl. No. 10/252,129, Advisory Action mailed Nov. 26, 2008", 3 pgs.
"U.S. Appl. No. 10/252,129, Amendment filed May 20, 2014", 17 pgs.
"U.S. Appl. No. 10/252,129, Appeal Brief filed Jan. 24, 2011", 21 pgs.
"U.S. Appl. No. 10/252,129, Appeal Brief filed Apr. 25, 2011", 32 pgs.
"U.S. Appl. No. 10/252,129, Appeal Decision mailed Mar. 20, 2014", 13 pgs.
"U.S. Appl. No. 10/252,129, Examiner Interview Summary mailed Mar. 19, 2008", 2 pgs.
"U.S. Appl. No. 10/252,129, Examiner Interview Summary mailed Mar. 31, 2009", 2 pgs.
"U.S. Appl. No. 10/252,129, Examiner Interview Summary mailed Jul. 11, 2008", 2 pgs.
"U.S. Appl. No. 10/252,129, Examiner's Answer to Appeal Brief mailed May 13, 2011", 19 pgs.
"U.S. Appl. No. 10/252,129, Final Office Action mailed Apr. 23, 2010", 18 pgs.
"U.S. Appl. No. 10/252,129, Final Office Action mailed May 29, 2008", 9 pgs.
"U.S. Appl. No. 10/252,129, Final Office Action mailed Jun. 18, 2009", 12 pgs.
"U.S. Appl. No. 10/252,129, Final Office Action mailed Sep. 15, 2008", 11 pgs.
"U.S. Appl. No. 10/252,129, Final Office Action mailed Oct. 5, 2007", 10 pgs.
"U.S. Appl. No. 10/252,129, Final Office Action mailed Dec. 27, 2006", 12 pgs.
"U.S. Appl. No. 10/252,129, Non Final Office Action mailed May 15, 2007", 10 pgs.
"U.S. Appl. No. 10/252,129, Non Final Office Action mailed Aug. 18, 2006", 10 pgs.
"U.S. Appl. No. 10/252,129, Non-Final Office Action mailed Jan. 14, 2008", 10 pgs.
"U.S. Appl. No. 10/252,129, Non-Final Office Action mailed Feb. 10, 2009", 11 pgs.
"U.S. Appl. No. 10/252,129, Non-Final Office Action mailed Nov. 12, 2009", 19 pgs.
"U.S. Appl. No. 10/252,129, Response Feb. 12, 2010 to Non Final Office Action mailed Nov. 12, 2009", 20 pgs.
"U.S. Appl. No. 10/252,129, Response filed Feb. 27, 2007 to Final Office Action mailed Dec. 27, 2006", 14 pgs.
"U.S. Appl. No. 10/252,129, Response filed Apr. 14, 2008 to Non-Final Office Action mailed Jan. 14, 2008", 14 pgs.
"U.S. Appl. No. 10/252,129, Response filed May 11, 2009 to Non Final Office Action mailed Feb. 10, 2009", 15 pgs.
"U.S. Appl. No. 10/252,129, Response filed Jul. 31, 2008 to Final Office Action mailed May 29, 2008", 13 pgs.
"U.S. Appl. No. 10/252,129, Response filed Aug. 13, 2007 to Non-Final Office Action mailed May 15, 2007", 16 pgs.
"U.S. Appl. No. 10/252,129, Response filed Aug. 18, 2009 to Final Office Action mailed Jun. 18, 2009", 19 pgs.
"U.S. Appl. No. 10/252,129, Response filed Sep. 18, 2009 to Advisory Action mailed Sep. 2, 2009", 19 pgs.
"U.S. Appl. No. 10/252,129, Response filed Sep. 23, 2010 to Final Office Action mailed Apr. 23, 2010", 16 pgs.
"U.S. Appl. No. 10/252,129, Response filed Oct. 5, 2006 to Non Final Office Action mailed Aug. 18, 2006", 15 pgs.
"U.S. Appl. No. 10/252,129, Response filed Oct. 19, 2009 to Advisory Action mailed Oct. 6, 2009", 17 pgs.
"U.S. Appl. No. 10/252,129, Response filed Nov. 11, 2008 to Final Office Action mailed Sep. 15, 2008", 14 pgs.
"U.S. Appl. No. 10/252,129, Response filed Nov. 26, 2007 to Final Office Action mailed Oct. 5, 2007", 15 pgs.
"U.S. Appl. No. 10/252,129, Response filed Dec. 2, 2008 to Advisory Action mailed Nov. 26, 2008", 14 pgs.
"U.S. Appl. No. 10/252,129, Response filed Dec. 2, 2008 to Final Office Action mailed Sep. 15, 2008", 14 pgs.
"U.S. Appl. No. 10/831,421, Advisory Action mailed Jan. 2, 2014", 3 pgs.
"U.S. Appl. No. 10/831,421, Examiner Interview Summary mailed Apr. 30, 2013", 3 pgs.
"U.S. Appl. No. 10/831,421, Final Office Action mailed Jun. 13, 2008", 18 pgs.
"U.S. Appl. No. 10/831,421, Final Office Action mailed Jul. 9, 2009", 18 pgs.
"U.S. Appl. No. 10/831,421, Final Office Action mailed Aug. 31, 2011", 25 pgs.
"U.S. Appl. No. 10/831,421, Final Office Action mailed Sep. 7, 2010", 20 pgs.
"U.S. Appl. No. 10/831,421, Final Office Action mailed Oct. 16, 2013", 30 pgs.

(56) References Cited

OTHER PUBLICATIONS

"U.S. Appl. No. 10/831,421, Final Office Action mailed Nov. 30, 2012", 30 pgs.
"U.S. Appl. No. 10/831,421, Non Final Office Action mailed Feb. 13, 2014", 30 pgs.
"U.S. Appl. No. 10/831,421, Non Final Office Action mailed Mar. 14, 2011", 21 pgs.
"U.S. Appl. No. 10/831,421, Non Final office Action mailed May 10, 2012", 34 pgs.
"U.S. Appl. No. 10/831,421, Non Final Office Action mailed May 23, 2013", 18 pgs.
"U.S. Appl. No. 10/831,421, Non-Final Office Action mailed Jan. 12, 2009", 16 pgs.
"U.S. Appl. No. 10/831,421, Non-Final Office Action mailed Mar. 5, 2010", 20 pgs.
"U.S. Appl. No. 10/831,421, Non-Final Office Action mailed Nov. 28, 2007", 12 pgs.
"U.S. Appl. No. 10/831,421, Response filed Jan. 11, 2010 to Final Office Action mailed Jul. 9, 2009", 6 pgs.
"U.S. Appl. No. 10/831,421, Response filed Feb. 28, 2008 to Non-Final Office Action mailed Nov. 28, 2007", 23 pgs.
"U.S. Appl. No. 10/831,421, Response filed Apr. 13, 2009 to Non Final Office Action mailed Jan. 12, 2009", 18 pgs.
"U.S. Appl. No. 10/831,421, Response filed Apr. 30, 2013 to Final Office Action mailed Nov. 30, 2012", 14 pgs.
"U.S. Appl. No. 10/831,421, Response filed Jun. 14, 2011 to Non Final Office Action mailed Mar. 14, 2011", 7 pgs.
"U.S. Appl. No. 10/831,421, Response filed Jul. 6, 2010 to Non Final Office Action mailed Mar. 5, 2010", 7 pgs.
"U.S. Appl. No. 10/831,421, Response filed Aug. 23, 2013 to Non Final Office Action mailed May 23, 2013", 12 pgs.
"U.S. Appl. No. 10/831,421, Response filed Sep. 7, 2012 to Non Final Office Action mailed May 10, 2012", 9 pgs.
"U.S. Appl. No. 10/831,421, Response filed Oct. 10, 2008 to Final Office Action mailed Jun. 13, 2008", 20 pgs.
"U.S. Appl. No. 10/831,421, Response filed Nov. 29, 2010 to Final Office Action mailed Sep. 7, 2010", 8 pgs.
"U.S. Appl. No. 10/831,421, Response Filed Nov. 30, 2011 to Non-Final Office Action mailed Aug. 31, 2011", 11 pgs.
"U.S. Appl. No. 10/831,421, Response filed Dec. 16, 2013 to Final Office Action mailed Oct. 16, 2013", 14 pgs.
"U.S. Appl. No. 10/831,421; Response filed Jan. 16, 2014 to Final Office Action mailed Oct. 16, 2013", 14 pgs.
"U.S. Appl. No. 11/647,728, Examiner Interview Summary mailed Aug. 11, 2010", 3 pgs.
"U.S. Appl. No. 11/647,728, Final Office Action mailed Jul. 13, 2010", 17 pgs.
"U.S. Appl. No. 11/647,728, Non-Final Office Action mailed Mar. 8, 2010", 18 pgs.
"U.S. Appl. No. 11/647,728, Notice of Allowance mailed Oct. 19, 2010", 11 pgs.
"U.S. Appl. No. 11/647,728, Response filed Jun. 8, 2010 to Non Final Office Action mailed Mar. 8, 2010", 13 pgs.
"U.S. Appl. No. 11/647,728, Response filed Sep. 22, 2010 to Final Office Action mailed Jul. 13, 2010", 14 pgs.
"U.S. Appl. No. 12/693,275, Non Final Office Action mailed Dec. 30, 2011", 6 pgs.
"U.S. Appl. No. 12/693,275, Notice of Allowance mailed May 8, 2012", 11 pgs.
"U.S. Appl. No. 12/693,275, Response filed Mar. 19, 2012 to Non Final Office Action mailed Dec. 30, 2011", 13 pgs.
"U.S. Appl. No. 12/783,458 , Response filed Aug. 15, 2013 to Non Final Office Action mailed May 10, 2013", 9 pgs.
"U.S. Appl. No. 12/783,458, Final Office Action mailed Sep. 25, 2012", 12 pgs.
"U.S. Appl. No. 12/783,458, Non Final Office Action mailed Mar. 8, 2012", 16 pgs.
"U.S. Appl. No. 12/783,458, Non Final Office Action mailed May 10, 2013", 12 pgs.

"U.S. Appl. No. 12/783,458, Notice of Allowance mailed Sep. 24, 2013", 6 pgs.
"U.S. Appl. No. 12/783,458, Response filed Jan. 18, 2013 to Final Office Action mailed Sep. 25, 2012", 10 pgs.
"U.S. Appl. No. 12/783,458, Response filed Jun. 8, 2012 to Non Final Office Action mailed Mar. 8, 2012", 9 pgs.
"U.S. Appl. No. 13/080,426, Non Final Office Action mailed Oct. 31, 2011", 8 pgs.
"U.S. Appl. No. 13/080,426, Notice of Allowance mailed Jan. 26, 2012", 7 pgs.
"U.S. Appl. No. 13/080,426, Notice of Allowance mailed Apr. 23, 2012", 7 pgs.
"U.S. Appl. No. 13/080,426, Response filed Dec. 28, 2011 to Non Final Office Action mailed Oct. 31, 2011", 9 pgs.
"U.S. Appl. No. 13/285,916, Advisory Action mailed Jan. 30, 2013", 3 pgs.
"U.S. Appl. No. 13/285,916, Final Office Action mailed Apr. 23, 2014", 16 pgs.
"U.S. Appl. No. 13/285,916, Final Office Action mailed Nov. 21, 2012", 17 pgs.
"U.S. Appl. No. 13/285,916, Non Final Office Action mailed Jun. 4, 2012", 16 pgs.
"U.S. Appl. No. 13/285,916, Non Final Office Action mailed Jul. 15, 2013", 17 pgs.
"U.S. Appl. No. 13/285,916, Response filed Jan. 17, 2013 to Final Office Action mailed Nov. 21, 2012", 15 pgs.
"U.S. Appl. No. 13/285,916, Response filed Aug. 30, 2012 to Non Final Office Action mailed Jun. 4, 2012", 15 pgs.
"U.S. Appl. No. 13/285,916, Response filed Oct. 14, 2013 to Non Final Office Action mailed Jul. 15, 2013", 13 pgs.
"U.S. Appl. No. 13/489,646, 312 Amendment filed Mar. 7, 2013", 4 pgs.
"U.S. Appl. No. 13/489,646, Non Final Office Action mailed Sep. 19, 2012", 8 pgs.
"U.S. Appl. No. 13/489,646, Notice of Allowance mailed Jan. 10, 2013", 7 pgs.
"U.S. Appl. No. 13/489,646, PTO Response to 312 Amendment mailed Mar. 14, 2013", 2 pgs.
"U.S. Appl. No. 13/489,646, Response filed Dec. 3, 2012 to Non Final Office Action mailed Sep. 19, 2012", 11 pgs.
"U.S. Appl. No. 13/550,233, Final Office Action mailed Oct. 30, 2013", 7 pgs.
"U.S. Appl. No. 13/550,233, Non Final Office Action mailed Mar. 26, 2013", 12 pgs.
"U.S. Appl. No. 13/550,233, Notice of Allowance mailed Jan. 8, 2014", 11 pgs.
"U.S. Appl. No. 13/550,233, Response filed Jun. 24, 2013 to Non Final Office Action mailed Mar. 26, 2013", 14 pgs.
"U.S. Appl. No. 13/550,233, Response filed Dec. 20, 2013 to Final Office Action mailed Oct. 30, 2013", 9 pgs.
"U.S. Appl. No. 14/231,613, Preliminary Amendment Apr. 14, 2014", 8 pgs.
"U.S. Appl. No. 14/231,624, Preliminary Amendment filed Apr. 14, 2014", 9 pgs.
"U.S. Appl. No. 14/231,633, Preliminary Amendment Apr. 14, 2014", 8 pgs.
"U.S. Appl. No. 14/231,639, Preliminary Amendment Apr. 11, 2014", 8 pgs.
"U.S. Appl. No. 14/231,650, Preliminary Amendment filed Apr. 9, 2014", 8 pgs.
"U.S. Appl. No. 14/231,684, Preliminary Amendment filed Apr. 9, 2014", 8 pgs.
"U.S. Appl. No. 14/231,696, Preliminary Amendment filed Apr. 9, 2014", 8 pgs.
"U.S. Appl. No. 14/231,706, Preliminary Amendment filed Apr. 9, 2014", 8 pgs.
"U.S. Appl. No. 14/231,719, Preliminary Amendment filed Apr. 9, 2014", 8 pgs.
"U.S. Appl. No. 14/231,722, Preliminary Amendment filed Apr. 9, 2014", 8 pgs.
"U.S. Appl. No. 14/268,986, Preliminary Amendment filed May 5, 2014", 7 pgs.

(56) References Cited

OTHER PUBLICATIONS

"U.S. Appl. No. 14/268,986, Supplemental Preliminary Amendment filed May 9, 2014", 7 pgs.
"Auction Watch: Buyer and Seller Services", [Online]. Retrieved from the Internet: <URL: http://web.archive.org/web/20000830150100/http://www.auctionwatch.com>, (Aug. 15, 2000), 30 pgs.
"Auctionwatch", [Online]. Retrieved from the Internet: <URL: http://web.archive.org/web/20000830150100/http://www.auctionwatch.com>, (Aug. 15, 2008), 46 pgs.
"AuctionWatch.com", [Online]. Retrieved from the Internet: <URL: http://web.archive.org.web/20011217190108/wsacp.auctionwatch.com/login.html?ret=/my/acp/>, (Dec. 17, 2001), 19 pgs.
"Blackthorne Products Page", [Online]. Retrieved from the Internet: <URL: http://web.archive.org/web/19990508065201/www.blackthornesw.com/Bthome/products>, (1999), 2 pgs.
"Chinese Application Serial No. 02824589, First Office Action mailed Mar. 23, 2007", with English translation of claims, 31 pgs.
"Chinese Application Serial No. 02824589, Office Action mailed Mar. 23, 2007", with English translation of claims, 16 pgs.
"Chinese Application Serial No. 02824589, Second Office Action mailed Dec. 28, 2007", with English translation of claims, 7 pgs.
"Chinese Application Serial No. 02824589.X , Response filed Mar. 1, 2008 to Office Action mailed Dec. 28, 2007", with English translation of claims, 16 pgs.
"Chinese Application Serial No. 02824589.X , Response filed Aug. 7, 2007 to Office Action mailed Mar. 23, 2007", with English translation of claims, 31 pgs.
"Chinese Application Serial No. 03813485.3, Office Action Mailed Jan. 9, 2009", with English translation of claims, 9 pgs.
"Chinese Application Serial No. 03813485.3, Office Action Mailed Jun. 24, 2010", with English translation of claims, 9 pgs.
"Chinese Application Serial No. 03813485.3, Office Action mailed Sep. 25, 2009", with English translation of claims, 15 pgs.
"Chinese Application Serial No. 03813485.3, Re-examination Decision mailed Nov. 29, 2010", with English translation of claims, 18 pgs.
"Chinese Application Serial No. 03813485.3, Response filed May 25, 2009 to Office Action mailed Jan. 9, 2009", with English translation of claims, 9 pgs.
"Chinese Application Serial No. 03813485.3, Response to Notification of Reexamination Filed: Aug. 9, 2010", with English translation of claims, 23 pgs.
"Chinese Application Serial No. 201110049654.X—Rejection Decision mailed Nov. 5, 2012", with English translation of claims, 16 pgs.
"Chinese Application Serial No. 201110049654.X, Office Action mailed Jan. 5, 2012", With English Translation, 10 pgs.
"Chinese Application Serial No. 201110049654.X, Office Action mailed Jul. 11, 2012", with English translation of claims, 10 pgs.
"Chinese Application Serial No. 201110049654.X, Response filed May 21, 2012 to Office Action mailed Jan. 5, 2012", with English translation of claims, 13 pgs.
"Chinese Application Serial No. 201110049654.X, Response filed Sep. 26, 2012 to Office Action mailed Jul. 11, 2012", 3 pgs.
"DHL and UPS offer country-specific services", Transportation and distribution, vol. 38, Iss. 12, (Dec. 1997), 18.
"Ebay—Your Personal Trading Community", [Online]. Retrieved from the Internet: <URL: http://web.archive.org/web/19991007062815/www.ebay.com>, (Oct. 1999), 23 pgs.
"European Application Serial No. 01959319.3, Office Action mailed May 15, 2007", 3 pgs.
"European Application Serial No. 01959319.3, Response filed Nov. 23, 2007 to Office Action mailed May 15, 2007", 23 pgs.
"European Application Serial No. 01959319.3, Summons to Attend Oral Proceedings mailed Jul. 13, 2012", 3 pgs.
"European Application Serial No. 02723169.5 Response filed Jun. 14, 2011 to Office Action mailed Feb. 15, 2011", 12 pgs.
"European Application Serial No. 02723169.5, Examination Notification Art. 94(3) mailed Mar. 17, 2014", 7 pgs.
"European Application Serial No. 02723169.5, Office Action mailed Feb. 15, 2011", 4 pgs.
"European Application Serial No. 02723169.5, Office Action mailed Feb. 20, 2008", 6 pgs.
"European Application Serial No. 02723169.5, Supplementary European Search Report mailed Sep. 26, 2006", 3 pgs.
"European Application Serial No. 03757395.3, Office Action mailed Oct. 8, 2010", 3 pgs.
"European Application Serial No. 03757395.3, Office Action mailed Dec. 8, 2005", 1 pg.
"European Application Serial No. 03757395.3, Office Action mailed Dec. 17, 2004", 21 pgs.
"European Application Serial No. 03757395.3, Response filed Apr. 18, 2011", 9 pgs.
"European Application Serial No. 03757395.3, Response filed Feb. 3, 2005 to Office Action mailed Dec. 17, 2004", 6 pgs.
"European Application Serial No. 03757395.3, Response filed Apr. 10, 2012 to Summons to Attend Oral Proceedings mailed Feb. 13, 2012", 20 pgs.
"European Application Serial No. 03757395.3, Search Report mailed Sep. 4, 2009", 2 pgs.
"European Application Serial No. 03757395.3, Summons to Attend Oral Proceedings mailed Feb. 13, 2012", 5 pgs.
"Frequently Asked Questions about Mister Lister", [Online]. Retrieved from the Internet: <URL: http://pages.ebay.co.uk/help/sellerguide/mr-lister-faq.html>, (Copyright 1995-2005), 5 pgs.
"Google looking at more Country Specific Domains", Europmedia, (Jan. 17, 2002), 1 pg.
"Hello direct store joins eBay network of merchants", PR Newswire, New York, NY, (May 23, 2002), 2 pgs.
"Indian Application Serial No. 1921/KOLNP/2004, Decision to Grant mailed Nov. 18, 2009", 2 pgs.
"Indian Application Serial No. 1921/KOLNP/2004, First Examination Report mailed Apr. 7, 2008", 11 pgs.
"Indian Application Serial No. 1921/KOLNP/2004, Response filed Mar. 6, 2009 to Examiner's First Report mailed Apr. 7, 2008", 13 pgs.
"International Application Serial No. PCT/US00/17136 International Search Report mailed Nov. 16, 2000", 6 pgs.
"International Application Serial No. PCT/US00/17136, International Preliminary Examination Report mailed Mar. 13, 2001", 4 pgs.
"International Application Serial No. PCT/US00/17136, International Search Report mailed Nov. 16, 2000", 5 pgs.
"International Application Serial No. PCT/US00/32088, International Search Report mailed Apr. 4, 2001", 6 pgs.
"International Application Serial No. PCT/US01/02584, International Search Report mailed Apr. 16, 2001", 4 pgs.
"International Application Serial No. PCT/US01/04811, International Search Report mailed Jun. 28, 2001", 6 pgs.
"International Application Serial No. PCT/US01/12398 International Search Report mailed Aug. 27, 2001", 3 pgs.
"International Application Serial No. PCT/US01/23854, International Preliminary Examination Report mailed Aug. 19, 2002", 3 pgs.
"International Application Serial No. PCT/US01/23854, International Search Report mailed Dec. 28, 2001", 3 pgs.
"International Application Serial No. PCT/US01/23854, International Search Report mailed Dec. 28, 2001", 6 pgs.
"International Application Serial No. PCT/US02/04692, International Search Report mailed Jun. 12, 2002", 5 pgs.
"International Application Serial No. PCT/US03/17915, Article 34 Amendment filed Dec. 17, 2003", 5 pgs.
"International Application Serial No. PCT/US03/17915, International Preliminary Examination Report mailed Mar. 26, 2004", 10 pgs.
"International Application Serial No. PCT/US03/17915, International Search Report mailed Nov. 26, 2003", 6 pgs.
"International Application Serial No. PCT/US99/18510, International Search Report mailed Oct. 29, 1999", 4 pgs.
"International Application Serial No. PCT/US99/29312, International Search Report mailed Apr. 18, 2000", 6 pgs.

(56) References Cited

OTHER PUBLICATIONS

"Korean Application Serial No. 2004-702020, Notice of Decision to Grant mailed Feb. 11, 2010", with English translation of claims, 3 pgs.
"Korean Application Serial No. 2004-702020, Response filed Jun. 30, 2009 to Office Action mailed Apr. 30, 2009", with English translation of claims, 43 pgs.
"Korean Application Serial No. 2004-702020, Response filed Dec. 24, 2009 to Final Office Action mailed Nov. 24, 2009", with English translation of claims, 36 pgs.
"Korean Application Serial No. 2004-702020, Voluntary Amendment filed Oct. 20, 2006", 260 pgs.
"Korean Application Serial No. 2004-7020202, Final Office Action mailed Nov. 24, 2009", with English translation of claims, 6 pgs.
"Korean Application Serial No. 2004-7020202, Office Action mailed Apr. 30, 2009", with English translation of claims, 6 pgs.
"Korean Application Serial No. 2004-7020202, Office Action mailed Aug. 29, 2008", with English translation of claims, 17 pgs.
"Korean Application Serial No. 2004-7020202, Preliminary Rejection mailed Nov. 30, 2007", with English translation of claims, 19 pgs.
"Korean Application Serial No. 2004-7020202, Response filed Apr. 30, 2008", with English translation of claims, 75 pgs.
"Korean Application Serial No. 2004-7020202, Response filed Dec. 29, 2008", with English translation of claims, 68 pgs.
"Korean Application Serial No. 2009-7027103, Final Office Action mailed Sep. 28, 2010", with English translation of claims, 5 Pgs.
"Korean Application Serial No. 2009-7027103, Notice of Decision to Grant mailed Feb. 14, 2011", with English translation of claims, 2 pgs.
"Korean Application Serial No. 2009-7027103, Office Action mailed, Mar. 26, 2010", with English translation of claims, 9 pgs.
"Korean Application Serial No. 2009-7027103, Response filed May 26, 2010 to Office Action mailed Mar. 26, 2010", with English translation of claims, 29 pgs.
"Korean Divisional Application Serial No. 2009-7027103, Appeal Filed Dec. 29, 2010 to Final Office Action mailed Sep. 28, 2010", with English translation of claims, 42 pgs.
"New eBay-like auction software released", Business Wire, Business Editors/High-Tech Writers; Business Wire; New York, (Mar. 17, 1999), 2 pgs.
"Onsale Joins Fray as Online Shopping Picks Up Speed: Internet Booms", Computer Reseller News, CMP Publications, Inc., USA, (Jun. 5, 1995), 1 pg.
"Onsale: Onsale Brings Thrill of Auctions and Bargain Hunting Online; Unique Internet retail service debuts with week-long charity auction for the Computer Museum in Boston", Business Wire, Dialog Web. 0489267 BW0022, (May 24, 1995), 3 pgs.
"Photodisc localizes Internet presence to better serve global markets;Adds country-specific content and languages to its Award-wining Websites", Business Wire, (May 27, 1998), 3 pgs.
"Thin Client", (c) Wikipedia, [Online]. Retrieved from the Internet: <URL:http://en.wikipedia.org/wiki/Thin_client>, (Accessed Feb. 15, 2008), 13 pgs.
"Thin Client Computing", [Online]. Retrieved from the Internet: <URL: http://web.archive.org/web/20040122033629/http://www.thinclient.net>, (Jan. 22, 2004), 24 pgs.
"Yahoo Homepage", Internet Archive Wayback Machine, http://web.archive.org/web/19991003015603/http://www.yahoo.com/index.html, (Oct. 3, 1999), 1 p.
"Yahoo!—Regional:Countries:Afghanistan", Copyright © 1994-97 Yahoo! Inc., [Online]. Retrieved from the Internet: <URL: http://web.archive.org/web/20060921181441/http://dir.yahoo.com/Regional/countries/afghanistan>, (Jun. 16, 1997), 1 pg.
"Yahoo!—Regional:Countries:Sweden", Copyright © 1994-97 Yahoo! Inc., [Online]. Retrieved from the Internet: <URL: http://web.archive.org/web/19970616194441/www.yahoo.com/Regional/Countries/Sweden/>, (Jun. 16, 1997), 2 pgs.

"Yahoo!—Auctions Celebrates One-Year Anniversary; As Online Auction Usage Continues to Grow, Yahoo! Is Quickly Becoming the World Marketplace of the New Millennium", Business Wire, (Sep. 14, 1999), 3 pages.
Akin, David, "Web retailing gains market muscle as concerns fade: Record season: Increasing number of sites catering for Canadian dollars", Financial Post, p04, XP002905105, (Dec. 26, 1998), 3 pages.
Alice, Michele, "eBay's 'Mister Lister' Auction Management Software", Auctionbytes-Update, No. 22, [Online]. Retrieved from the Internet: <URL: http://www.auctionbytes.com/cab/abu/y200/m09/abu0022/s05>, (Sep. 24, 2000), 3 pgs.
auctionwatch.com, et al., , Prima Publishing, Roseville, CA. ISBN 0-7615-2999-3 AuctionWatch.com's Official Guide to Online Buying and Selling: Professional Tips, Tactics and Techniques at Your Fingertips., (2000), 307 pgs.
auctionwatch.com, et al., "AuctionWatch CD", Prima Publishing, Roseville, CA. AuctionWatch.com's Official Guide to Online Buying and Selling: Professional Tips, Tactics and Techniques at Your Fingertips., (2000).
Baumann, G. W, "Personal Optimized Decision/Transaction Program", IBM Technical Disclosure Bulletin, (Jan. 1995), 83-84.
Bidnbuy, "Going, going, virtually gone . . . ", Business and Finance Dialog File 20#06012646, (Jun. 17, 1999), 3 pgs.
Business Wire, "Bay Builder Releases Major Innovation for Online Wireless Auctions.", Recovered via Dialog Database on Feb. 15, 2008, (Mar. 10, 2000), 2 pgs.
Business Wire, "Mediappraise Receives National Award for Web-based Technology That Enables Companies to Solve Thorny HR Problem", Business Wire, (Dec. 14, 1998), 1-2.
Business Wire, "Subasta.com Enters Into Strategic Partnership with From2.com", Business Wire, Obtained from Proquest, Document No. 43206061, (Jul. 16, 1999), 2 pages.
Business Wire, "Subasta.com, the Premier Online Auction Board for Latin America, Spain, and the Hispanic Sector of the U.S., Has Attracted Over 60,000 Viewers in Less Than Two Months!", Business Wire, (Jul. 16, 1999), 2 pages.
Business Wire, "Yahoo! Launches Three New European Auctions Services; Yahoo! Italy, Yahoo! Spain and Yahoo! Sweden Unveil New Local Auctions", Business Wire, Obtained from Proquest, Document No. 45061209, (Sep. 23, 1999), 3 pages.
Clemons, E., "Evaluating the prospects for alternative electronic securities", Proceedings of ICIS 91: 12th International Conference on Information Systems, (Dec. 16-18, 1991), 53-63.
Collete, Stacy, "Thin Clients Pull in Car Customers: Auto Auction company eyes move to Web.(Industry Trend or Event)", Computerworld recovered via dialog database on Feb. 15, 2008, (Apr. 5, 1999), p. 41(1).
Cooper, C., et al., "Playing Catch-Up: U.S. Web Firms Get Slow Start in Europe, Amid Crowded Field—Used to Being First and Best at Home, They Stumble in World's No. 2 Market—Pouncing on Amazon Delays", Wall Street Journal Europe, Obtained from Proquest, Document No. 46338867, (Nov. 15, 1999), 5 pages.
Graham, Ian, "The Emergence of Linked Fish Markets in Europe", Electronic Markets. vol. 8, No. 2, (1998), 29-32.
Grubbs, L., "Top 5 auction utilities", PC World.com, San Francisco, CA, (Dec. 4, 2000), 2 pgs.
Hansell, Saul, "Meg Whitman and eBay, Net Survivors", New York Times, (May 5, 2002), 5 pgs.
Hauser, R., "Anonymous Delivery of Goods in Electronic Commerce", IBM Technical Disclosure Bulletin, 39(3), (Mar. 1996), 363-366.
Hess, C. M, et al., "Computerized Loan Organization System: An Industry Case Study of the Electronic Markets Hypothesis", MIS Quarterly, vol. 18(3), (Sep. 1994), 251-275.
Hutchinson, Art, "E-Commerce : Building a Model", Art. Communications Week recovered via Dialog Database on Feb. 15, 2008., (Mar. 17, 1997), p. 57.
Klein, Stefan, "Introduction to Electronic Auctions", Focus Theme, vol. 7, No. 4, (1997), 3-6.
Lassila, Ora, "Web metadata; A Matter of Semantics", IEEE Internet Computing, v2i4pg30 Proquest #1424143061, (1998), 15 pgs.

(56) References Cited

OTHER PUBLICATIONS

Lee, H. G, "Electronic brokerage and electronic auction: the impact of IT on market structures", Proceedings of the Twenty-Ninth Hawaii International Conference on System Sciences, vol. 4, (1996), 397-406.

Lee, Ho Geun, "AUCNET: Electronic Intermediary for Used-Car Transactions", Focus Theme, Electronic Markets, vol. 7, No. 4, (1997), 24-28.

M2 Presswire, "HP completes online strategy with launch of e-commerce site", Proquest#43225990, (Jun. 29, 1999), 3 pgs.

M2 Presswire, "United Technologies: UTC's Carrier Corp. teams with FreeMarkets to create largest Asian-based B2B online auction market to date; UTC Division identifies average annual savings of more than 16 percent on electric motors through FreeMarkets B2B eMarketpla", M2 Presswire, (Mar. 22, 2000), 2 pages.

Malone, T., et al., "Electronic Markets and Electronic Hierarchies", Communications of the ACM, vol. 30, No. 6, (Jun. 1987), 484-497.

Mardesich, Jodi, "Site Offers Clearance for End-of-Life Products—Onsale Takes Auction Gavel Electronic", Computer Reseller News, (Jul. 8, 1996), 2 pps.

Massimb, Marcel, "Electronic Trading, Market Structure and Liquidity", Financial Analysts Journal, 50(1), (Jan./Feb. 1994), 39-50.

McClenahen, John, "Net Gains", Industry Week, Cleveland. vol. 248, Iss. 10, [Online]. Retrieved from the Internet: <URL: http://proquest.umi.com/pqdweb?index=O&did=41808971&SrchMode=1&sid=5&Fmt=4& V . . . >, (May 17, 1999), p. 51.

Meade, J., "Visual 360: A Performance Appraisal System That's 'Fun'", HR Magazine, Society for Human Resource Management., (Jul. 1999), 3 pgs.

Merrill, K., "GE Capital to Extend Integrator Buying Spree", Computer Reseller News, (Jul. 1996), pp. 2 and 32.

Morin, Lee M.E., "Multilingual Communications Device", U.S. Appl. No. 08/200,049, filed Feb. 22, 1994, (Mar. 2, 2004), 7 pgs.

Neo, B. S, "The implementation of an electronic market for pig trading in Singapore", Journal of Strategic Information Systems; vol. 1(5), (Dec. 1992), 278-288.

Pollick, M., "Sold! on eBay: As antique and collectible dealers see their sales increase through online auctions such as eBay, more of them are deciding that the internet is not something to be afraid of", Sarasota Herald Tribune, Obtained from Proquest, Document No. 45499060, (Oct. 11, 1999), 8 pages.

Post, D. L, et al., "Application of auctions as a pricing mechanism for the interchange of electric power", IEEE Transactions on Power Systems, 10(3), (Aug. 1995), 1580-1584.

PR Newswire Europe Ltd., "Mitsubishi Venture, Wells Fargo Partner to Offer Multi-Currency E-Commerce Storefront", PR Newswire, Obtained from Proquest, Document No. 39345965, (Mar. 1, 1999), 3 pages.

Preist, Chris, et al., "Adaptive Agents in a Persistent Shout Double Auction", International Conference on Information and Computation Economies, Proceedings of the first international conference on Information and computation economies, (1998), 11-18.

Pressler, Margaret, "Sells on eBay; Housewife finds herself head of multinational software firm", Washington Post, Proquest # 44484325, (Sep. 5, 1999), 3 pgs.

Reck, Martin, "Trading-Process Characteristics of Electronic Auctions", Focus Theme, vol. 7, No. 4, (1997), 17-23.

Resnick, Paul, "Reputation systems", Communications of the ACM, 43(12), (Dec. 2000), 45-48.

Rockoff, T. E, et al., "Design of an Internet-based system for remote Dutch auctions", Internet Research: Electronic Networking Applications and Policy, vol. 5(4), (Jan. 1, 1995), 10-16.

Schmid, B. F, "The Development of Electronic Commerce", EM—Electronic Markets, No. 9-10, (Oct. 1993), 2 pgs.

Schneider, G. M, et al., "An Introduction to Programming and Problem Solving with Pascal", An Introduction to Programming and Problem Solving with Pascal, Second Edition, John Wiley & Sons, Inc., New York, (1982), 3 Pages.

Siegmann, Ken, "Nowhere to go but up", PC Week; vol. 12(42), Ziff-Davis Publishing Company, (Oct. 23, 1995), 1-3.

Tak, Y., et al., "The SIFT Information Dissemination System", ACM Transactions on Database Systems. vol. 24, Issue 4. ACM Press, (Dec. 1999), 529-565.

Tapscott, D., "eBay endagners traditional papers auctioneer can pack far more punch in your sales pitch", National Post, Proquest# 54945579, (Oct. 9, 1999), 3 pgs.

Tjostheim, Ingvar, et al., "A case study of an on-line auction for the World Wide Web", Norwegian Computing Center (NR), [Online]. Retrieved from the Internet: <URL: http://www.nr.no/~ingvar/enter98.html>, (Accessed Feb. 21, 2005), 1-10.

Turban, Efraim, "Auctions and Bidding on the Internet: An Assessment", Focus Theme, EM—Electronic Markets, vol. 7, No. 4, (1997), 7-11.

Van Heck, E., et al., "Experiences with Electronic Auctions in the Dutch Flower Industry", Focus Theme, Erasmus University, The Netherlands, (1996), 6 pgs.

Warbelow, A, et al., "Aucnet: TV Auction Network System", Harvard Business School Case/Study, HBVR#9-190-001, USA, (Jul. 1989), 1-16.

Wilson, D., "Going . . . Going . . . Gone!Bargain-hunters and collectors can scour auctions from home via the Internet", The Gazette, Proquest #4116732, (Apr. 27, 1999), 4 pgs.

Wilson, T., "Act Globally, Think Locally", InternetWeek, Issue 789, Obtained from Proquest, Document No. 46352181, (Nov. 15, 1999), 4 p.

Zwass, V., "Electronic Commerce: Structures and Issues", International Journal of Electronic Commerce, Fall 1996, vol. 1, No. 1, (Fall 1996), 3-23.

"U.S. Appl. No. 09/602,110, Final Office Action mailed Sep. 10, 2014", 19 pgs.

"U.S. Appl. No. 10/252,129, Examiner Interview Summary mailed Dec. 1, 2014", 3 pgs.

"U.S. Appl. No. 10/252,129, Non Final Office Action mailed Sep. 23, 2014", 31 pgs.

"U.S. Appl. No. 10/252,129, Response filed Dec. 17, 2014 to Non Final Office Action mailed Sep. 23, 2014", 24 pgs.

"U.S. Appl. No. 10/831,421, Examiner Interview Summary mailed Jan. 12, 2015", 3 pgs.

"U.S. Appl. No. 10/831,421, Final Office Action mailed Sep. 8, 2014", 29 pgs.

"U.S. Appl. No. 10/831,421, Non Final Office Action mailed Feb. 9, 2015", 11 pgs.

"U.S. Appl. No. 10/831,421, Response filed Jan. 8, 2015 to Final Office Action mailed Sep. 8, 2014", 12 pgs.

"U.S. Appl. No. 10/831,421, Response filed Jul. 14, 2014 to Non Final Office Action mailed Feb. 13, 2014", 13 pgs.

"U.S. Appl. No. 13/285,916, Decision on Pre-Appeal Brief mailed Jul. 15, 2014", 2 pgs.

"U.S. Appl. No. 13/285,916, Examiner Interview Summary mailed Jan. 22, 2015", 3 pgs.

"U.S. Appl. No. 13/285,916, Non Final Office Action mailed Oct. 30, 2014", 19 pgs.

"U.S. Appl. No. 13/285,916, Pre-Appeal Brief Request filed Jun. 20, 2014", 5 pgs.

"U.S. Appl. No. 13/285,916, Response filed Jan. 30, 2015 to Non Final Office Action mailed Oct. 30, 2014", 22 pgs.

"U.S. Appl. No. 14/231,696, Non Final Office Action mailed Jul. 31, 2014", 18 pgs.

"U.S. Appl. No. 14/231,696, Response filed Oct. 31, 2014 to Non Final Office Action mailed Jul. 31, 2014", 23 pgs.

"U.S. Appl. No. 14/231,719, Non Final Office Action mailed Aug. 14, 2014", 12 pgs.

"U.S. Appl. No. 14/231,719, Response filed Nov. 12, 2014 to Non Final Office Action mailed Aug. 14, 2014", 17 pgs.

"U.S. Appl. No. 14/268,986, Notice of Non-Compliant Amendment mailed Aug. 12, 2014", 3 pgs.

"U.S. Appl. No. 14/268,986, Response filed Nov. 12, 2014 to Notice of Non-Compliant Amendment mailed Aug. 12, 2014", 3 pgs.

"U.S. Appl. No. 14/595,074, Preliminary Amendment filed Jan. 19, 2015", 10 pgs.

(56) References Cited

OTHER PUBLICATIONS

"European Application Serial No. 02723169.5, Response filed Jul. 17, 2014", 19 pgs.
"Stamps.com Becomes the Standard in Internet Mailing and Shipping for Top Auction Resource and Trading Sites", Stamps.com: PR Newswire Mar. 15, 2000, PQDialog #449383612, [Online]. Retrieved from the Internet: <URL: http://search.proquest.com/professional/docview/449383612?accountid=161862>, (Mar. 15, 2000), 6 pgs.
"Yahoo! Launches Yahoo! PayDirect for Online Person-to-Person Payments; Relationship with CI BC National Bank Allows Consumers to Easily Send and Receive Payments via Email", Business Editors & High-Tech Writers. Business Wire, [Online]. Retrieved from the Internet: <URL: http://search.proquest.com/professional/docview/445932440?accountid=161862>, (Jul. 31, 2000), 4 pgs.
"U.S. Appl. No. 14/231,624, Response filed Jul. 7, 2016 to Non Final Office Action mailed Feb. 23, 2016", 16 pgs.
"U.S. Appl. No. 14/231,633, Response filed Jul. 7, 2016 to Non Final Office Action Apr. 22, 2016", 14 pgs.
"U.S. Appl. No. 14/231,639, Response filed Jul. 7, 2016 to Non Final Office Action mailed Feb. 23, 2016", 16 pgs.
"U.S. Appl. No. 14/231,650, Response filed Jul. 7, 2016 to Non Final Office mailed Mar. 25, 2016 Action", 16 pgs.
"U.S. Appl. No. 14/231,684, Response filed Jul. 7, 2016 to Non Final Office Action mailed Feb. 10, 2016", 16 pgs.
"U.S. Appl. No. 14/231,696, Response filed Jul. 7, 2016 to Final Office Action mailed Feb. 8, 2016", 16 pgs.
"U.S. Appl. No. 14/231,706, Response filed Jul. 7, 2016 to Non Final Office Action mailed Feb. 11, 2016", 15 pgs.
"U.S. Appl. No. 14/231,719, Response filed Jul. 5, 2016 to Final Office Action mailed Feb. 9, 2016", 16 pgs.
"U.S. Appl. No. 14/268,986, Non Final Office Action mailed Jun. 17, 2016", 17 pgs.
"U.S. Appl. No. 10/252,129, Non Final Office Action mailed Nov. 20, 2015", 35 pgs.
"U.S. Appl. No. 14/231,613, Non Final Office Action mailed Jun. 3, 2016", 20 pgs.
"U.S. Appl. No. 14/231,624, Non Final Office Action mailed Feb. 23, 2016", 36 pgs.
"U.S. Appl. No. 14/231,624, Response filed Dec. 10, 2015 to Final Office Action mailed Oct. 22, 2015", 15 pgs.
"U.S. Appl. No. 14/231,633, Non Final Office Action mailed Apr. 22, 2016", 35 pgs.
"U.S. Appl. No. 14/231,633, Response filed Dec. 10, 2015 to Final Office Action mailed Oct. 16, 2015", 14 pgs.
"U.S. Appl. No. 14/231,639, Non Final Office Action mailed Feb. 23, 2016", 36 pgs.
"U.S. Appl. No. 14/231,639, Response filed Dec. 10, 2015 to Final Office Action mailed Oct. 23, 2015", 14 pgs.
"U.S. Appl. No. 14/231,650, Examiner Interview Summary mailed Mar. 25, 2016", 3 pgs.
"U.S. Appl. No. 14/231,650, Non Final Office Action mailed Mar. 25, 2016", 34 pgs.
"U.S. Appl. No. 14/231,650, Response filed Dec. 10, 2015 to Final Office Action mailed Oct. 23, 2015", 15 pgs.
"U.S. Appl. No. 14/231,684, Non Final Office Action mailed Feb. 10, 2016", 31 pgs.
"U.S. Appl. No. 14/231,684, Response filed Dec. 16, 2015 to Final Office Action mailed Oct. 28, 2015", 12 pgs.
"U.S. Appl. No. 14/231,696, Final Office Action mailed Feb. 8, 2016", 31 pgs.
"U.S. Appl. No. 14/231,696, Response filed Dec. 10, 2015 to Non Final Office Action mailed Oct. 22, 2015", 15 pgs.
"U.S. Appl. No. 14/231,706, Non Final Office Action mailed Feb. 11, 2016", 32 pgs.
"U.S. Appl. No. 14/231,706, Response filed Dec. 10, 2015 to Final Office Action mailed Oct. 14, 2015", 14 pgs.
"U.S. Appl. No. 14/231,719, Final Office Action mailed Feb. 9, 2016", 32 pgs.
"U.S. Appl. No. 14/231,719, Non Final Office Action mailed Nov. 19, 2015", 25 pgs.
"U.S. Appl. No. 14/231,719, Response filed Dec. 16, 2015 to Non Final Office Action mailed Nov. 19, 2015", 14 pgs.
"U.S. Appl. No. 14/231,722, Non Final Office Action mailed Feb. 9, 2016", 32 pgs.
"U.S. Appl. No. 14/231,722, Response filed Jun. 6, 2016 to Non Final Office Action mailed Feb. 9, 2016", 15 pgs.
"U.S. Appl. No. 14/231,722, Response filed Dec. 10, 2015 to Final Office Action mailed Oct. 21, 2015", 14 pgs.
"U.S. Appl. No. 14/268,986, Final Office Action mailed Dec. 3, 2015", 13 pgs.
"U.S. Appl. No. 14/268,986, Response filed Apr. 4, 2016 to Final Office Action mailed Dec. 3, 2016", 21 pgs.
"U.S. Appl. No. 14/595,074, Final Office Action mailed Jan. 14, 2016", 10 pgs.
U.S. Appl. No. 14/231,613, Response filed Sep. 28, 2016 to Non Final Office Action mailed Jun. 3, 2016, 17 pgs.
U.S. Appl. No. 14/231,624, Final Office Action mailed Aug. 31, 2016, 28 pgs.
U.S. Appl. No. 14/231,624, Supplemental Amendment filed Aug. 23, 2016, 7 pgs.
U.S. Appl. No. 14/231,633 Supplemental Amendment filed on Aug. 17, 2016, 9 pgs.
U.S. Appl. No. 14/231,633, Final Office Action mailed Aug. 24, 2016, 28 pgs.
U.S. Appl. No. 14/231,639 Supplemental Amendment filed on Aug. 17, 2016, 8 pgs.
U.S. Appl. No. 14/231,639, Final Office Action mailed Aug. 26, 2016, 28 pgs.
U.S. Appl. No. 14/231,650, Final Office Action mailed Aug. 31, 2016, 28 pgs.
U.S. Appl. No. 14/231,650, Supplemental Amendment filed Aug. 23, 2016, 8 pgs.
U.S. Appl. No. 14/231,684, Final Office Action mailed Aug. 31, 2016, 29 pgs.
U.S. Appl. No. 14/231,684, Supplemental Amendment filed Aug. 23, 2016, 8 pgs.
U.S. Appl. No. 14/231,696 Supplemental Amendment filed on Aug. 16, 2016, 9 pgs.
U.S. Appl. No. 14/231,696, Non Final Office Action mailed Aug. 23, 2016, 28 pgs.
U.S. Appl. No. 14/231,706, Final Office Action mailed Sep. 1, 2016, 28 pgs.
U.S. Appl. No. 14/231,706, Supplemental Amendment filed Aug. 23, 2016, 7 pgs.
U.S. Appl. No. 14/268,986, Examiner Interview Summary mailed Sep. 16, 2016, 3 pgs.
U.S. Appl. No. 14/268,986, Response filed Sep. 19, 2016 to Non Final Office Action mailed Jun. 17, 2016, 24 pgs.

* cited by examiner

STORED CONSTRUCTS TABLE

| CONSTRUCT ID | CONSTRUCT |
|---|---|
| 0001 | WHAT IS YOUR ADDRESS? |
| 0002 | |
| ⋮ | |

FIG. 3A

STORED TRANSLATED CONSTRUCTS TABLE

| CONSTRUCT ID | LANGUAGE ID | TRANSLATED CONSTRUCT |
|---|---|---|
| 0001 | FR | |
| 0001 | IT | |
| 0001 | ES | |
| ⋮ | | |

FIG. 3B

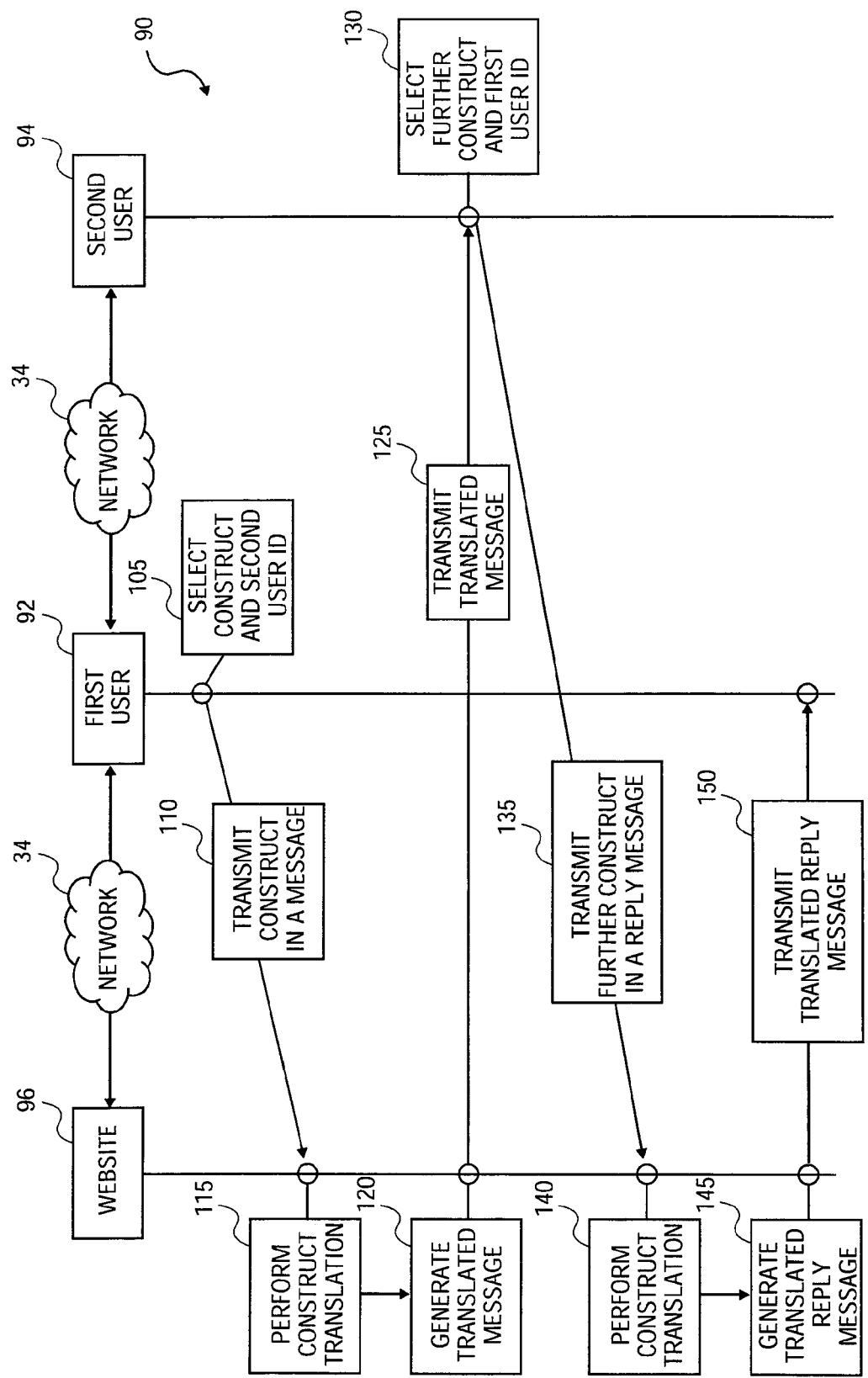

SYSTEM AND METHOD TO FACILITATE TRANSLATION OF COMMUNICATIONS BETWEEN ENTITIES OVER A NETWORK

RELATED APPLICATIONS

This application is a continuation of U.S. application Ser. No. 12/783,458, filed on May 19, 2010, which is a continuation of U.S. application Ser. No. 09/976,301, filed Oct. 11, 2001, entitled "System and Method to Facilitate Translation of Communications Between Entities Over a Network," which are incorporated herein by reference in their entirety.

FIELD OF THE INVENTION

The present invention relates generally to the field of network-based communications and, more specifically, to a system and method to facilitate translation of communications between entities over a network, such as the Internet.

BACKGROUND OF THE INVENTION

The explosive growth of the Internet as a publication and interactive communication platform has created an electronic environment that is changing the way business is transacted. As the Internet becomes increasingly accessible around the world, communications between users that utilize different spoken or written languages increase exponentially.

Several attempts have been made to facilitate such communications and to provide translation software packages residing on a computer and configured to translate text or voice communications from one language to another. Some of these translation software packages, however, can be expensive and can result in a financial burden for a user of such software packages. Furthermore, such software packages require considerable storage capacity to be available on the computer.

Another drawback of the translation software packages relates to their limited applicability. For example, current technology allows for translation of text through common text translation software installed on a computer. The translation may be accomplished in a variety of ways, one of which is direct word for word translation of the communication, which is imperfect and produces grammatically incorrect sentences in the translated language. Current technology also allows for limited translation of voice communications through speech recognition software installed on the computer. However, spoken language translation is mostly available in restricted domains, where the database of recognizable words is limited to a specific set of words.

SUMMARY OF THE INVENTION

A system and method to facilitate translation of communications between entities over a network are described. Multiple predetermined language constructs are communicated to a first entity as a first transmission over the network. Responsive to selection by the first entity of a language construct from the predetermined language constructs, a translated language construct corresponding to the selected language construct is identified. Finally, the translated language construct is communicated to a second entity as a second transmission over the network.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which:

FIG. 3A illustrates an exemplary stored constructs table.

FIG. 3B illustrates an exemplary stored translated constructs table.

FIG. 4 is an interaction diagram illustrating a sequence of interactions, according to an exemplary embodiment of the present invention, to facilitate translation of communications between entities over a network.

DETAILED DESCRIPTION

A system and method to facilitate translation of communication between entities over a network are described. In the following detailed description of embodiments of the invention, reference is made to the accompanying drawings in which like references indicate similar elements, and in which are shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
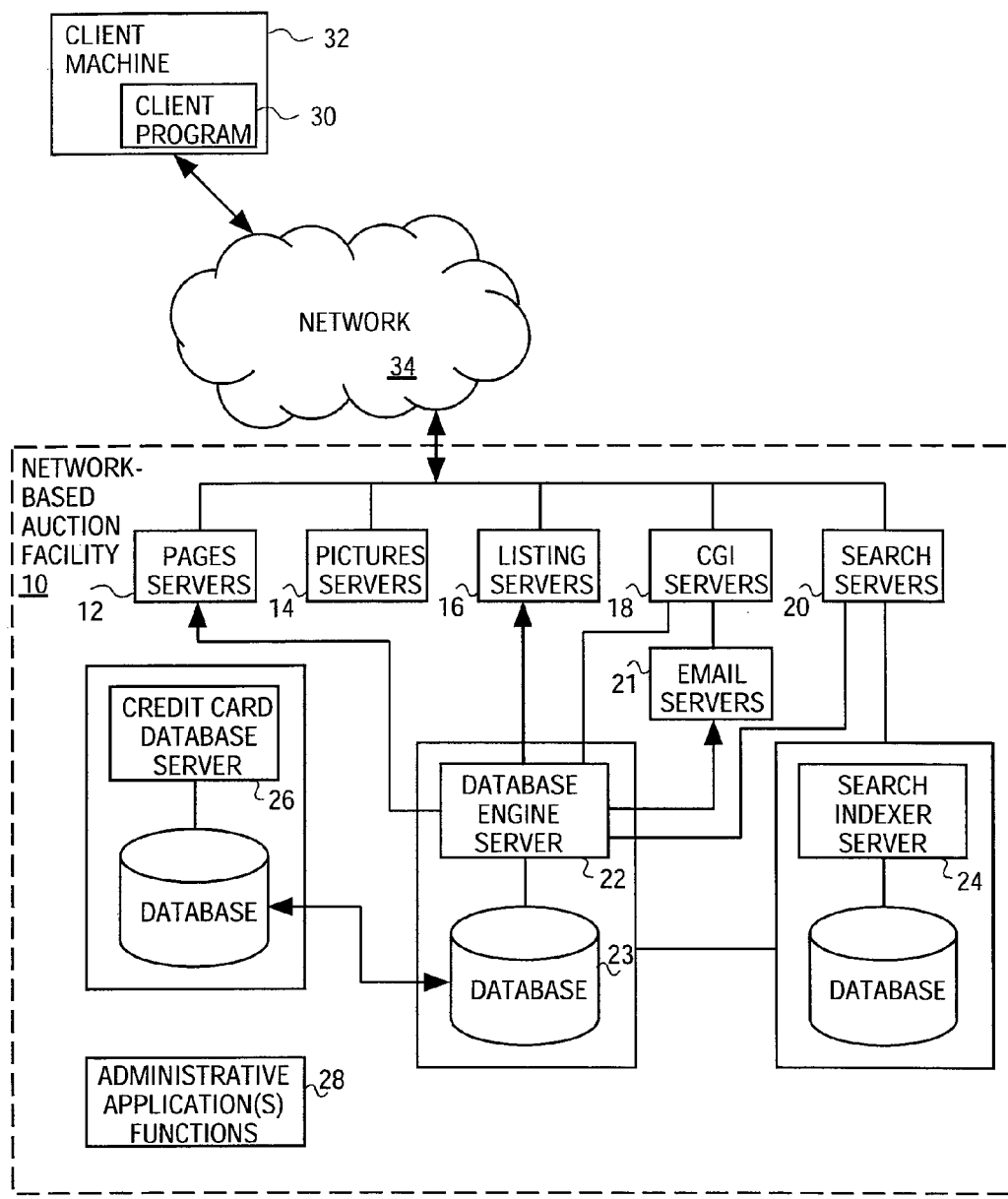
FIG. 1 is a block diagram illustrating an exemplary network-based transaction facility in the form of a network-based auction facility.

FIG. 1 is a block diagram illustrating an exemplary network-based transaction facility in the form of a network-based auction facility 10. While an exemplary embodiment of the present invention is described within the context of an auction facility, it will be appreciated by those skilled in the art that the invention will find application in many different types of computer-based, and network-based, commerce facilities.

The auction facility 10 includes one or more of a number of types of front-end servers, namely communications servers in the exemplary form of page servers 12 that deliver web pages to multiple entities (e.g., markup language documents), picture servers 14 that dynamically deliver images to be displayed within the web pages, listing servers 16, processing servers in the exemplary form of Common Gateway Interface (CGI) or Internet Server Application Program Interface (ISAPI) servers 18 that provide an intelligent interface to the back-end of the auction facility 10, and search servers 20 that handle search requests to the auction facility 10. In addition, the auction facility 10 includes e-mail servers 21 that provide, inter alia, automated e-mail communications to/from entities of the facility 10.

The auction facility 10 further includes one or more back-end servers, for example a database engine server 22, a search indexer server 24 and a credit card database server 26, each of which maintains and facilitates access to a respective database 23. The network-based auction facility 10, such as an Internet-based auction facility 10, may be accessed by a client program 30, such as a browser (e.g., the Internet Explorer browser distributed by Microsoft Corporation of Redmond, Wash.) that executes on a client machine 32 and accesses the facility 10 via a network 34, such as, for example, the Internet. Other examples of networks that a client may utilize to access the auction facility 10 includes a wide area network (WAN), a local area network (LAN), a wireless network (e.g., a cellular network), or the Plain Old Telephone Service (POTS) network.

Figure 2:
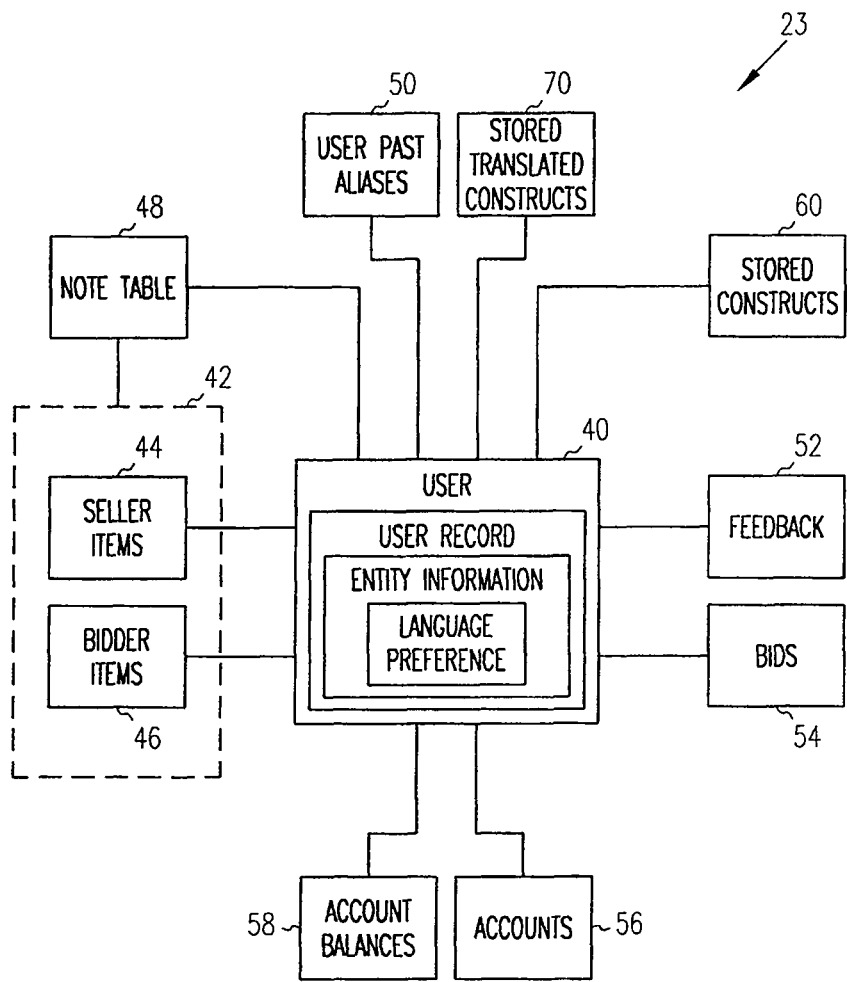
FIG. 2 is a block diagram illustrating an exemplary database, maintained by and accessed via a database engine server, which at least partially implements and supports the auction facility.

FIG. 2 is a block diagram illustrating an exemplary database 23, maintained by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as a collection of objects in an object-oriented database.

Central to the database 23 shown in FIG. 2 is a user table 40, which contains a record for each entity or user of the auction facility 10. Each user may operate as a seller, a buyer, or both, within the auction facility 10. The database 23 also includes items tables 42 that may be linked to the user table 40. Specifically, the table 42 includes a seller items table 44 and a bidder items table 46. A user record in the user table 40 may be linked to multiple items that are being, or have been, auctioned via the auction facility 10. A link indicates whether the user is a seller or a bidder (or buyer) with respect to items for which records exist within the items table 42.

The database 23 further includes a note table 48 populated with note records that may be linked to one or more item records within the items table 42 and/or to one or more user records within the user table 40. Each note record within the note table 48 may include, inter alia, a comment, description, history, or other information pertaining to an item being auctioned via the auction facility 10, or pertaining to a user of the auction facility 10.

A number of other tables are also shown to be linked to the user table 40, such as a user past aliases table 50, a feedback table 52, a bids table 54, an accounts table 56, and an account balances table 58.

The database 23 is also shown to include two tables specifically to enable an exemplary embodiment of the present invention. A stored construct table 60 stores a predetermined number of language constructs, such as sentences, phrases, questions, or any other known types of language constructs. A stored translated construct table 70 contains a number of records, each record storing translated language constructs corresponding to the language constructs stored in table 60. Prior to any communication between client 32 and the network-based auction facility 10, each translated language construct is generated and stored in the stored translated construct table 70, and the correspondence to one or more predetermined language constructs in the stored language constructs table 60 is defined, such that each translated language construct includes a predetermined translation of the corresponding predetermined language construct.

FIG. 3A illustrates an exemplary embodiment of a stored construct table 60. As illustrated in FIG. 3A, the table 60 includes a construct ID field 62 to store a unique identifier for each stored language construct to be used in an exemplary embodiment of the present invention. The table 60 further includes a construct field 64 to store each language construct maintained within the database 23.

FIG. 3B illustrates an exemplary embodiment of a stored translated construct table 70. As illustrated in FIG. 3B, the table 70 includes a construct ID field 72 to store a unique identifier for each translated language construct, which corresponds to the identifier of the language construct stored within field 62. The table 70 further includes a language ID field 74 to store an identifier for a language pertaining to the translated construct, and a translated construct field 76 to store the translated construct in the particular language identified in the language ID field 74.

FIG. 4 is an interaction diagram illustrating a sequence 90 of interactions, according to an exemplary embodiment of the present invention, to facilitate translation of communications between entities in the exemplary form of a first user 92 and a second user 94. While the sequence 90 describes a client-server environment, whereby communications between the first and second users 92 and 94 are facilitated by, or performed through, a website 96, it will also be appreciated that the teachings of the present inventions may be applied to a peer-to-peer environment, whereby the users 92 and 94 communicate directly and not through the website 96.

As illustrated in FIG. 4, the sequence 90 commences at block 105 with the selection by the first user 92 of a language construct and of a user identifier of the second user 94. The language construct may be selected, in one embodiment, from a drop-down list containing multiple predetermined language constructs, the drop-down list being displayed in a first interactive area of a web form communicated to the first user 92 from the website 96. Alternatively, the language construct may be selected from a window, which presents the web form containing the predetermined language constructs to the first user 92. The predetermined language constructs are generated and stored in the stored constructs table 60 of the database 23 prior to being communicated to the first user 92 in the drop-down list or web form.

At block 110, the language construct is communicated from the first user 92 to the website 96 via the network 34 in a message directed to the second user 94, for example an electronic mail (e-mail) message.

At block 115, the website 96 (e.g., the auction facility 10) utilizes the search servers 20 to conduct a search of the user table 40, the stored constructs table 60, and the stored translated constructs table 70 to retrieve a translated language construct, based on the user identifier corresponding to the second user 94. The search of the user table 40 locates the user information pertaining to the second user 94, including a language preference of the second user 94, and the search of the tables 60 and 70 locates the translated language construct corresponding to the selected language construct and the language preference of the second user 94. In one embodiment, the predetermined language constructs and the translated language constructs are generated and stored in respective tables 60 and 70 prior to the language constructs being communicated to the first user 92, so as to define a correspondence between each predetermined language construct and at least one associated translated language construct. Alternatively, the storing is so as to define a correspondence between a set of the translated language constructs, wherein each translated language construct of the set includes a predetermined translation of a common underlying language construct.

At block 120, the website 96 generates a translated message to be transmitted to the second user 94. In one embodiment, the translated message is an e-mail message generated by the e-mail servers 21 and directed to the second user 94, which contains the translated language construct. Alternatively, the translated e-mail message may contain multiple interactive fields to allow the second user 94 to respond to the first user 92.

At block 125, the translated message is communicated to the second user 94. In one embodiment, an e-mail message containing the translated language construct is communicated by the e-mail servers 21 to the second user 94.

At block 130, the second user 94 selects a further language construct and a user identifier of the first user 92 to which the further language construct is to be communicated. The further language construct may be selected, in one embodiment, from a drop-down list containing multiple predetermined language constructs translated in the language preference of the second user 94, the drop-down list being displayed in one interactive field of the multiple fields communicated to the second user 94 from the website 96. Alternatively, the second user 94 may only receive the translated message from the website 96 and take no further action.

At block 135, the further language construct is communicated from the second user 94 to the website 96 via the network 34 in a reply message directed to the first user 92, for example an electronic mail (e-mail) message.

At block 140, the website 96 (e.g., the auction facility 10) utilizes the search servers 20 to conduct a search of the user table 40, the stored constructs table 60, and the stored translated constructs table 70 to retrieve a translated further language construct, based on the user identifier corresponding to the first user 92. The search of the user table 40 locates the user information pertaining to the first user 92, including a language preference of the first user 92, and the search of the tables 60 and 70 locates the translated further language construct corresponding to the selected further language construct and the language preference of the first user 92.

At block 145, the website 96 generates a translated reply message to be transmitted to the first user 92. In one embodiment, the translated reply message is an e-mail message generated by the e-mail servers 21 and directed to the first user 92, which contains the translated further language construct.

At block 150, the translated reply message is communicated to the first user 92. In one embodiment, an e-mail message containing the translated further language construct is communicated by the e-mail servers 21 to the first user 92.

It should be noted that the sequence 90 may have any one of a number of applications and may be implemented within any number of environments. For example, the sequence 90 may be used to communicate information from any one entity, such as first or second users 92 and 94, to the website 96 in a language preferred by the respective entity. The website 96 may subsequently translate the information and use it in any one of a number of applications, such as in the preparation of item listings, or in the updating of the user information.

Figure 5:
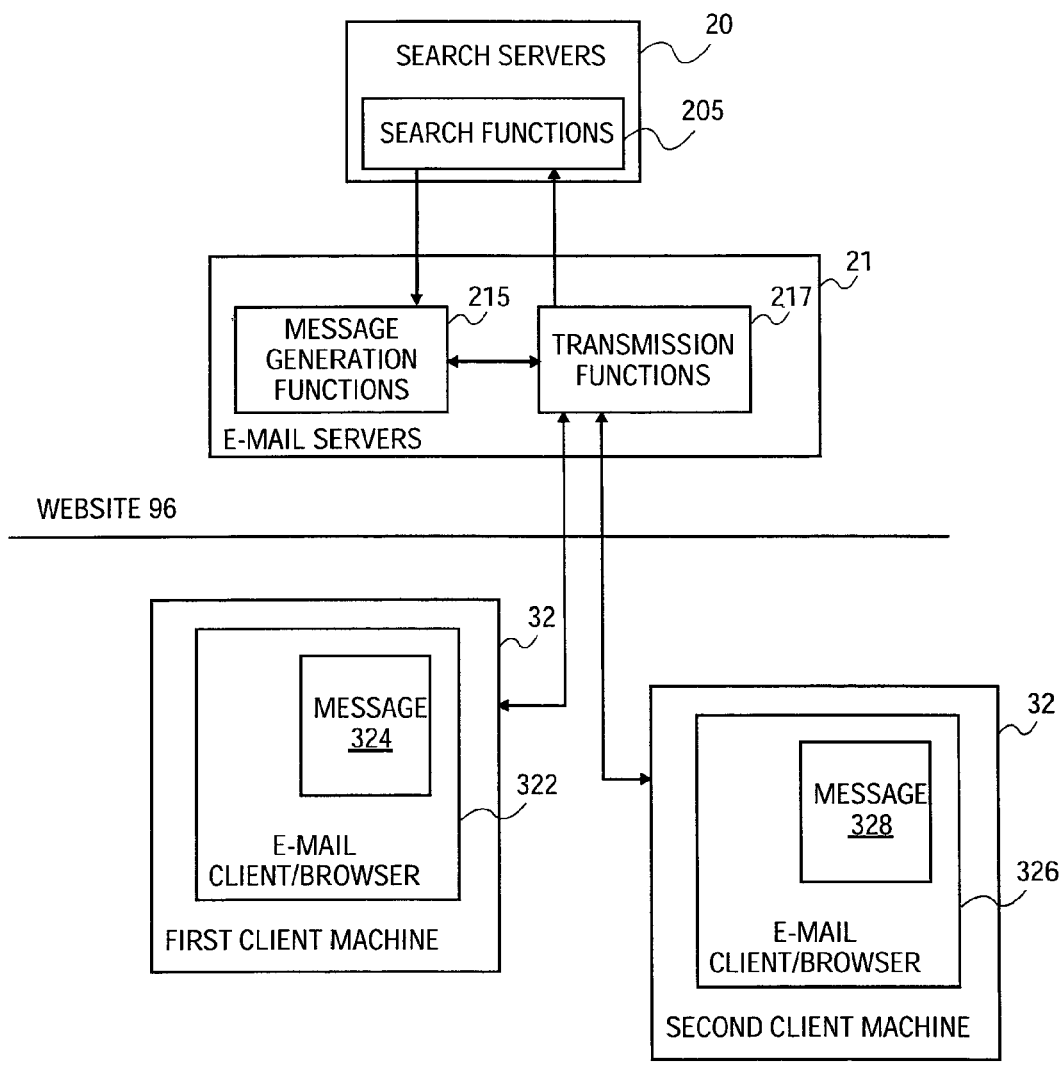
FIG. 5 is a block diagram illustrating an exemplary environment in which the interaction sequence illustrated in FIG. 4 may be employed.

FIG. 5 is a block diagram illustrating an exemplary environment in which the interaction sequence 90 may be employed. As illustrated in FIG. 5, client machines 32 are shown to reside outside the context of a website, such as the exemplary website 96 shown in FIG. 4. Accordingly, this embodiment describes an application which allows a first user of a client machine 32, such as the first client machine 32, to communicate language constructs to a second user of a further client machine 32, such as the second client machine 32, both of which reside outside the website 96 or any other commerce facility. Alternatively, each user of the client machines 32 may only communicate language constructs to the website 96 in order to request performance of applications by the website 96.

Referring to FIG. 5, the first user selects a language construct and a user identifier of the second user in an e-mail client or browser 322 that executes in the first client machine 32, the second user being the recipient of an e-mail message 324 containing the language construct to be communicated by the first user. The language construct may be selected, in one embodiment, from a drop-down list containing multiple predetermined language constructs, the drop-down list being displayed in a first interactive area of a web form communicated to the first user from the website 96. Alternatively, the language construct may be selected from a window, which presents the web form containing the predetermined language constructs to the first user.

The message is shown to be communicated to the e-mail servers 21 of the website 96. Specifically, the message containing the language construct may be communicated, in one embodiment, as an e-mail message or by utilizing any other transfer protocol or communication. The e-mail servers 21 receive the message using the transmission functions 217 and proceed to parse the message to extract the language construct and the user identifier for the second user that operates the second client machine 32.

The search servers 20 within the website 96 receive the language construct and the user identifier and search tables within corresponding databases using search functions 205 to provide a translated language construct to be communicated to the second user. Specifically, in one embodiment, the search servers 20 search the user table 40 shown in FIG. 2 to locate user information pertaining to the second user, including a language preference of the second user. The search servers 20 further search the stored constructs table 60 and the stored translated constructs table 70 shown in FIG. 2 to locate the translated language construct corresponding to the selected language construct and the language preference of the second user.

The translated language construct is subsequently communicated to the e-mail servers 21. The e-mail servers 21 generate a translated e-mail message containing the translated language construct using message generation functions 215. The translated e-mail message is then communicated to the second client machine via the transmission functions 217.

In one embodiment, the second user selects a further language construct and a user identifier of the first user in an e-mail client or browser 326 that executes in the second client machine 32, the first user being the recipient of a reply e-mail message 328 containing the further language construct to be communicated by the second user. The language construct may be selected, in one embodiment, from a drop-down list containing multiple predetermined language constructs translated in the language preference of the second user, the drop-down list being displayed in one interactive field of multiple interactive fields that may be communicated to the second user from the website 96. Alternatively, the second user may only receive the translated e-mail message and take no further action.

The reply message is shown to be communicated to the e-mail servers 21 of the website 96. Specifically, the reply message containing the further language construct may be communicated, in one embodiment, as an email message or by utilizing any other transfer protocol or communication. The e-mail servers 21 receive the reply message using the transmission functions 217 and proceed to parse the reply message to extract the further language construct and the user identifier for the first user that operates the first client machine 32.

The search servers 20 within the website 96 receive the further language construct and the user identifier and search tables within corresponding databases using search functions 205 to provide a translated further language construct to be communicated to the first user. Specifically, in one embodiment, the search servers 20 search the user table 40 shown in FIG. 2 to locate user information pertaining to the first user, including a language preference of the first user. The search servers 20 further search the stored constructs table 60 and the stored translated constructs table 70 shown in FIG. 2 to locate the translated further language construct corresponding to the selected further language construct and the language preference of the first user.

The translated further language construct is subsequently communicated to the e-mail servers 21. The e-mail servers 21 generate a translated reply message containing the translated further language construct using message generation functions 215. The translated reply message is then communicated to the first client machine via the transmission functions 217.

An alternative application would allow each user of the first or second client machines 32 to communicate selected language constructs to the website 96. In this case, the website 96 may perform search and translation operations and use the translated language construct to update listings via listing servers 16, or to update user information in the user table 40.

Figure 6:
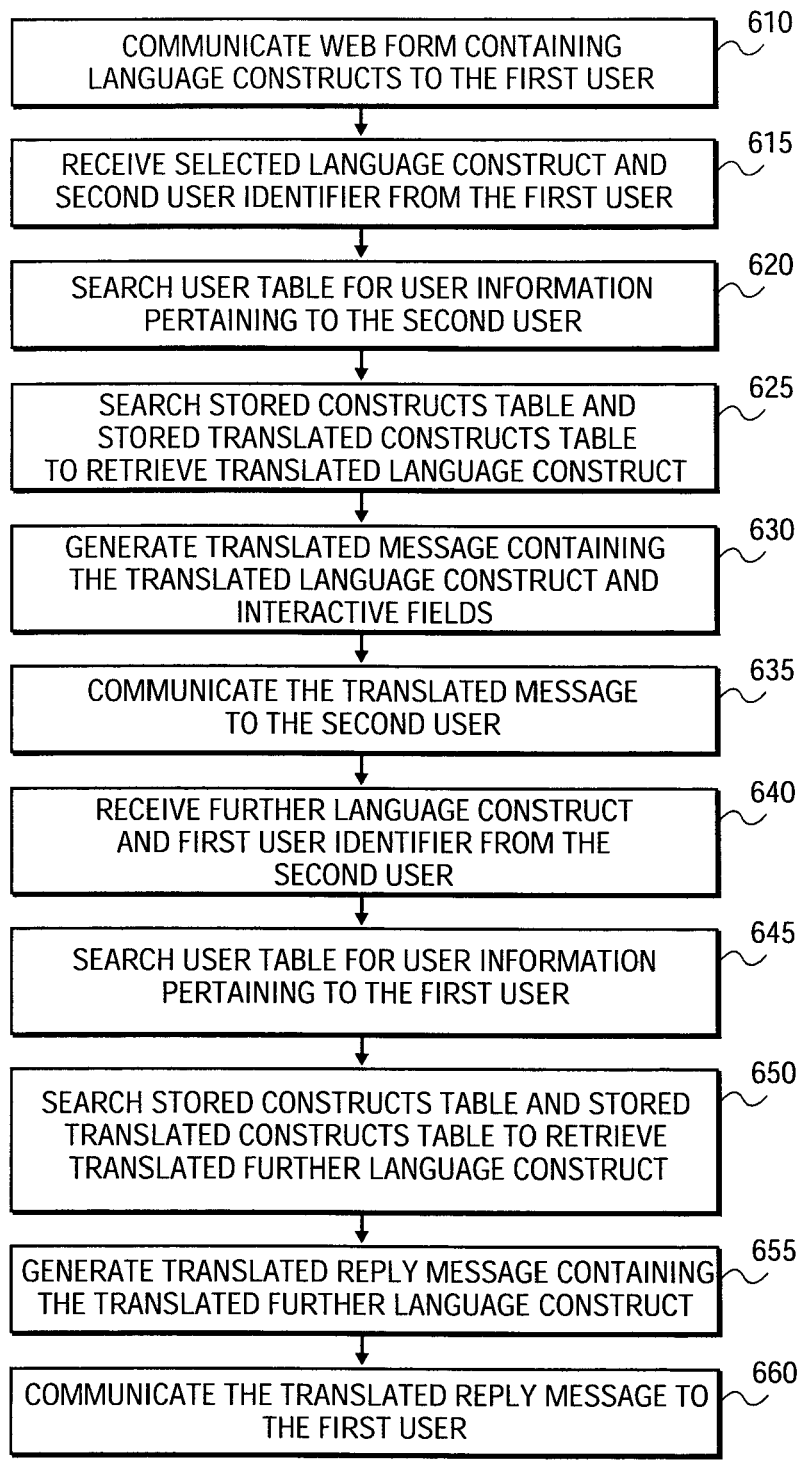
FIG. 6 is a flow chart illustrating a method, according to an exemplary embodiment of the present invention, to facilitate translation of communications between entities over a network.

FIG. 6 is a flow chart illustrating a method, according to an exemplary embodiment of the present invention, to facilitate translation of communications between entities over a network. It will be appreciated that the method may, as described above, be utilized to facilitate translation of communications, and is not limited to the context of a network-based auction facility.

As illustrated in FIG. 6, at processing block 610, a web form containing language constructs is communicated to the first user. At processing block 615, a selected language construct and a user identifier of the second user are received from the first user.

At processing block 620, the user table 40 is searched to locate user information pertaining to the second user, including a language preference of the second user. At processing block 625, the stored constructs table 60 and the stored translated constructs table 70 are searched to retrieve a translated language construct corresponding to the selected language construct.

At processing block 630, a translated message containing the translated language construct and multiple interactive fields is generated. At processing block 635, the translated message is communicated to the second user.

At processing block 640, a further language construct and a user identifier of the first user are received from the second user. At processing block 645, the user table 40 is searched to locate user information pertaining to the first user, including a language preference of the first user. At processing block 650, the stored constructs table 60 and the stored translated constructs table 70 are searched to retrieve a translated further language construct corresponding to the selected further language construct.

At processing block 655, a translated reply message containing the translated further language construct is generated. Finally, at processing block 660, the translated reply message is communicated to the first user.

Figure 7:
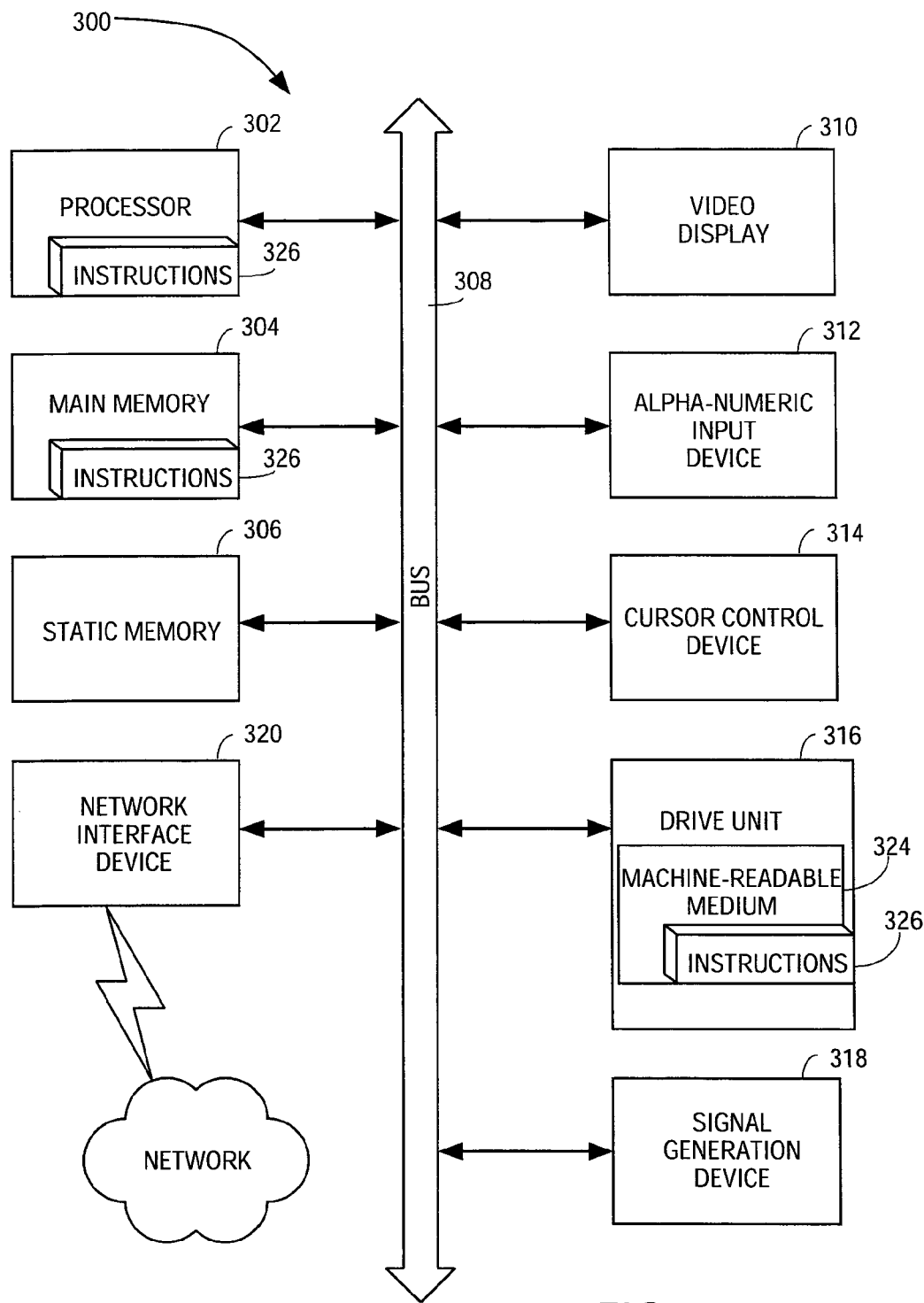
FIG. 7 is a diagrammatic representation of a machine in the exemplary form of a computer system within which a set of instructions may be executed.

FIG. 7 shows a diagrammatic representation of a machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 18 (e.g., a speaker), and a network interface device 320.

The disk drive unit 316 includes a machine-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 320.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A system comprising:
   one or more hardware processors configured to perform operations comprising:
   receiving, by a communications server from a device of a first entity, a message directed to a second entity that includes a selection of a first language construct in a first language;
   identifying, by the communications server from a stored constructs table, a construct identifier associated with the first language construct;

determining, by a processing server, a language identifier associated with the second entity that is to receive a translation of the first language construct in a second language, the language identifier corresponding to the second language;

retrieving, by the processing server, a second language construct by finding an entry in a translated construct table that contains both the construct identifier and the language identifier associated with the second entity, the second language construct being a translation of the first language construct in the second language;

generating a translated message that comprises the second language construct; and transmitting, to a device of the second user, the translated message that comprises the second language construct.

2. The system of claim 1, wherein the operations further comprise:

searching a user table for the second entity; and retrieving the language identifier for the second entity from the user table, the language identifier corresponding to a language preference stored in the user table for the second entity.

3. The system of claim 1, wherein the construct identifier is found in both the stored constructs table for the first language construct in the first language and the translated constructs table for the translation of the first language construct in the second language.

4. The system of claim 1, wherein the operations further comprise providing a plurality of language constructs in the first language to the first entity, wherein the first language construct comprises a selected language construct from the plurality of language constructs.

5. A method comprising:

receiving, from a device of a first entity, a message directed to a second entity that includes a selection of a first language construct in a first language;

identifying, from a stored constructs table, a construct identifier corresponding to the first language construct;

determining, using a hardware processor, a language identifier corresponding to the second entity that is to receive a translation of the first language construct in a second language, the language identifier corresponding to the second language;

retrieving a second language construct by finding an entry in a translated construct table that contains both the construct identifier and the language identifier corresponding to the second entity, the second language construct being a translation of the first language construct in the second language; and generating a translated message that comprises the second language construct; and transmitting, to a device of the second user, the translated message that comprises the second language construct.

6. The method of claim 5, further comprising providing a plurality of predetermined language constructs in the first language to the first entity, wherein the first language construct comprises a selected language construct from the plurality of predetermined language constructs.

7. The method of claim 6, wherein the providing the plurality of predetermined language constructs comprises causing presentation of the plurality of predetermined language constructs in an interactive area of a web form.

8. The method of claim 6, wherein the providing the plurality of predetermined language constructs comprises causing presentation of the plurality of predetermined language constructs in a drop-down list.

9. The method of claim 5, wherein the construct identifier comprises a numerical construct identifier.

10. The method of claim 5, wherein the determining the language identifier comprises:

searching a user table for the second entity; and retrieving the language identifier for the second entity from the user table, the language identifier corresponding to a language preference stored in the user table for the second entity.

11. The method of claim 5, wherein the construct identifier is found in both the stored constructs table for the first language construct in the first language and the translated constructs table for the translation of the first language construct in the second language.

12. A machine-readable storage device storing instructions that, when executed by a processor of a machine, cause the machine to perform operations comprising:

receiving, from a device of a first entity, a message directed to a second entity that includes a selection of a first language construct in a first language and an indication of a second entity from a first entity;

identifying, from a stored constructs table, a construct identifier corresponding to the first language construct;

determining, using a hardware processor, a language identifier corresponding to the second entity that is to receive a translation of the first language construct in a second language, the language identifier corresponding to the second language;

retrieving a second language construct by finding an entry in a translated construct table that contains both the construct identifier and the language identifier corresponding to the second entity, the second language construct being a translation of the first language construct in the second language; and generating a translated message that comprises the second language construct; and transmitting, to a device of the second user, the translated message that comprises the second language construct.

13. The machine-readable storage device of claim 12, wherein the operations further comprise providing a plurality of predetermined language constructs in the first language to the first entity, and wherein the first language construct comprises a selected language construct from the plurality of predetermined language constructs.

14. The machine-readable storage device of claim 13, wherein the providing the plurality of predetermined language constructs comprises presenting the plurality of predetermined language constructs in an interactive area of a web form.

15. The machine-readable storage device of claim 13, wherein the providing the plurality of predetermined language constructs comprises presenting the plurality of predetermined language constructs in a drop-down list.

16. The machine-readable storage device of claim 12, wherein the construct identifier comprises a numerical construct identifier.

17. The machine-readable storage device of claim 12, wherein the determining the language identifier comprises:

searching a user table for the second entity; and retrieving the language identifier for the second entity from the user table, the language identifier corresponding to a language preference stored in the user table for the second entity.

18. The machine-readable storage device of claim 12, wherein the construct identifier is found in both the stored constructs table for the first language construct in the first language and the translated constructs table for the translation of the first language construct in the second language.

\* \* \* \* \*

UNITED STATES PATENT AND TRADEMARK OFFICE
CERTIFICATE OF CORRECTION

PATENT NO.         : 9,514,128 B2                                         Page 1 of 1
APPLICATION NO.    : 14/165434
DATED              : December 6, 2016
INVENTOR(S)        : Steve Grove It is certified that error appears in the above-identified patent and that said Letters Patent is hereby corrected as shown below:

On page 4, in Column 1, item (56) References Cited, under "Other Publications", Line 25, delete "Aug. 8, 2015" and insert --Aug. 5, 2015--, therefor On page 5, in Column 2, item (56) References Cited, under "Other Publications", Line 60, delete "Apr. 12, 2006" and insert --Apr. 13, 2005--, therefor On page 5, in Column 2, item (56) References Cited, under "Other Publications", Line 61, delete "Dec. 12, 2005"," and insert --Dec. 14, 2004",--, therefor Signed and Sealed this
Third Day of April, 2018

Andrei Iancu
*Director of the United States Patent and Trademark Office*